US012597992B2

(12) United States Patent
Sakamoto et al.

(10) Patent No.: US 12,597,992 B2
(45) Date of Patent: Apr. 7, 2026

(54) RELAY APPARATUS, WIRELESS COMMUNICATION SYSTEM, WIRELESS COMMUNICATION METHOD AND PROGRAM

(71) Applicant: NTT, Inc., Tokyo (JP)

(72) Inventors: Kazumitsu Sakamoto, Musashino (JP); Yosuke Fujino, Musashino (JP); Daisuke Goto, Musashino (JP); Yasuyoshi Kojima, Musashino (JP); Kiyohiko Itokawa, Musashino (JP)

(73) Assignee: NTT, Inc., Tokyo (JP)

( * ) Notice: Subject to any disclaimer, the term of this patent is extended or adjusted under 35 U.S.C. 154(b) by 296 days.

(21) Appl. No.: 18/268,059

(22) PCT Filed: Dec. 25, 2020

(86) PCT No.: PCT/JP2020/048794
§ 371 (c)(1),
(2) Date: Jun. 16, 2023

(87) PCT Pub. No.: WO2022/137521
PCT Pub. Date: Jun. 30, 2022

(65) Prior Publication Data
US 2024/0039619 A1 Feb. 1, 2024

(51) Int. Cl.
*H04B 7/185* (2006.01)
*H04B 17/318* (2015.01)
(52) U.S. Cl.
CPC ........... *H04B 7/185* (2013.01); *H04B 17/318* (2015.01)

(58) Field of Classification Search
CPC ....... H04B 7/185; H04B 17/318; H04B 7/155
See application file for complete search history.

(56) References Cited

U.S. PATENT DOCUMENTS

| | | | | |
|---|---|---|---|---|
| 5,856,804 A | * | 1/1999 | Turcotte | H01Q 3/2605 |
| | | | | 342/372 |
| 2020/0274611 A1 | * | 8/2020 | Mendelsohn | H04B 7/18515 |
| 2021/0152240 A1 | * | 5/2021 | Buer | H04B 7/2041 |

FOREIGN PATENT DOCUMENTS

| | | | |
|---|---|---|---|
| JP | 2020502858 A | 1/2020 | |
| JP | 2020517161 A | 6/2020 | |
| WO | WO-2018080606 A1 | 5/2018 | |
| WO | WO-2018190794 A1 | 10/2018 | |

OTHER PUBLICATIONS

Z. Qu et al., LEO Satellite Constellation for Internet of Things, IEEE Access, vol. 5, pp. 18391-18401, 2017.

(Continued)

*Primary Examiner* — Zhitong Chen

(57) ABSTRACT

A relay device that relays wireless signals transmitted from a plurality of first communication devices to a second communication device while moving includes: a first reception unit configured to receive signals transmitted from the plurality of first communication devices through a reception antenna; and a direction control unit configured to control a reception direction of the reception antenna based on dense district information which is estimated based on the reception of the signals and indicates a district where the first communication devices are located with high density exceeding a predetermined reference.

14 Claims, 7 Drawing Sheets

(56)  References Cited

OTHER PUBLICATIONS

"Adopted a technology demonstration plan as an innovative satellite technology demonstration theme to realize '20 Gbps super-communication between low earth orbit satellites and the ground, and ultra-wide area IoT data collection',—In-orbit demonstration of the world's first low earth orbit satellite MIMO technology, etc.—", NTT Press Release, Nippon Telegraph and Telephone Corp, May 29, 2020, pp. 1-2, [retrieval date Mar. 20, 2021] Internet <URL:https://group.ntt/jp/newsrelease/2020/05/29/200529a.html?_ga=2.260484429.1980764300.1616995518-596875783.1616995518>.
International Search Report issued in PCT/JP2020/048794, mailed on Apr. 13, 2021.

* cited by examiner

RELAY APPARATUS, WIRELESS COMMUNICATION SYSTEM, WIRELESS COMMUNICATION METHOD AND PROGRAM

CROSS-REFERENCE TO RELATED APPLICATIONS

This application is a 371 National Stage of International Application No. PCT/JP2020/048794, filed on Dec. 25, 2020. The entire disclosure of the above application is incorporated herein by reference.

TECHNICAL FIELD

The present invention relates to a relay apparatus, a wireless communication system, a wireless communication method and a program.

BACKGROUND ART

Internet of Things (IoT) systems that implement various applications by connecting a small terminal device to the Internet have become widespread. As application examples of IoT systems, systems in which a plurality of IoT terminals sense environmental information such as air temperature, room temperature, acceleration, and luminous intensity, transmit the environmental information by wireless signals, and collect the environmental information on a cloud side are known. IoT terminals including various sensors are installed in various places. For example, it is also assumed that IoT is used to collect data of places where it is difficult to install base stations, such as buoys and ships on the sea and mountainous areas.

On the other hand, there is a wireless system that performs wireless communication between a plurality of communication devices on the ground using a communication satellite, an unmanned aerial vehicle (UAV), or the like as a relay station. As a wireless system using a communication satellite as a relay station, there are a case of using a low earth orbit (LEO) satellite that orbits in a low orbit at around an altitude of 1,000 [km] and a case of using a geostationary orbit (GEO) satellite that orbits at an altitude of 36,000 [km]. An LEO satellite has a shorter propagation distance than a GEO satellite. Therefore, when an LEO satellite is used as a relay station, communication can be implemented with low delay and low propagation loss (Non-Patent Literature 1). In this case, a configuration of a high frequency circuit included in an LEO satellite or a communication device on the ground becomes easy. Incidentally, unlike a GEO satellite, an LEO satellite orbits above the earth, and thus, a satellite direction viewed from a communication device on the ground constantly changes. A visible time per orbit of the LEO satellite in each communication device on the ground is several minutes. Therefore, a time zone in which the LEO satellite and each communication device on the ground can communicate with each other is limited.

On the other hand, a low power wide area (LPWA) is known as a wireless system capable of wide area communication with low power and a low transmission rate appropriate for communication of IoT terminals. A satellite IoT system in which a communication satellite collects data from an IoT terminal using LPWA has recently been studied. In general, wireless communication between a communication satellite and a communication device on the ground has a longer propagation distance than wireless communication in which direct communication is performed between a plurality of communication devices on the ground. However, LPWA can be applied by using an LEO satellite. In the case of such a satellite IoT system, it is possible to accommodate IoT terminals in an aeronautical field, a marine field, and a rural area in which there is difficulty only with normal LPWA. In this case, since a hub station is not required, service deployment is facilitated.

CITATION LIST

Non Patent Literature

Non Patent Literature 1: Z. Q U et al., "LEO Satellite Constellation for Internet of Things," IEEE Access, Vol. 5, pp. 18391-18401, 2017

SUMMARY OF INVENTION

Technical Problem

The number of IoT terminals has recently been increasing. Furthermore, for example, since the LPWA has a low data rate, the time during which the IoT terminal transmits data becomes relatively long. Therefore, it is assumed that opportunities for a plurality of IoT terminals existing densely in a specific district to transmit signals to LEO satellites at the same timing also increase. In such a situation, the LEO satellite on which plurality of reception antennas are mounted can receive signals transmitted from a plurality of IoT terminals at the same timing by performing reception beam control. In this case, the LEO satellite is required to separate a plurality of received signals. In general, a direction in which a plurality of IoT terminals transmitting signals at the same timing are densely located does not necessarily match a front direction (reception direction) of a reception array antenna surface mounted on the LEO satellite. The reception beam can be sharpened in the front direction of the reception array antenna surface, and thus the performance of the signal separation is improved. However, the performance of the signal separation further deteriorates as the directions differ more. Accordingly, depending on a positional relationship between the LEO satellite and the IoT terminal, the performance of signal separation may deteriorate, and thus the reliability of communication may deteriorate.

In view of the foregoing circumstances, an objective of the present invention is to provide a relay apparatus, a wireless communication system, a wireless communication method and a program capable of inhibiting deterioration in communication reliability.

Solution to Problem

One aspect of the present invention is a relay device that relays wireless signals transmitted from a plurality of first communication devices to a second communication device while moving. The relay device includes: a first reception unit configured to receive signals transmitted from the plurality of first communication devices through a reception antenna; and a direction control unit configured to control a reception direction of the reception antenna based on dense district information which is estimated based on the reception of the signals and indicates a district where the first communication devices are located with high density exceeding a predetermined reference.

One aspect of the present invention is a wireless communication system including: a plurality of first communication devices; a second communication device; and a relay device configured to relay signals transmitted from the plurality of first communication devices to the second communication device while moving. The first communication device includes a first transmission unit that transmits the signal to the relay device. The relay device includes a first reception unit that receives the signals transmitted from the plurality of first communication devices through a reception antenna, a direction control unit that controls a reception direction of the reception antenna based on dense district information which is estimated based on the reception of the signals and indicates a district where the first communication devices are located with high density exceeding a predetermined reference, and a second transmission unit that transmits the signal to the second communication device.

One aspect of the present invention is a wireless communication method in which signals transmitted from a plurality of first communication devices is relayed to a second communication device by a moving relay device. The method includes: a first transmission step of transmitting the signal to the relay device, by the first communication device; a reception step of receiving the signals transmitted from the plurality of first communication devices through a reception antenna by the relay device; a direction control step of controlling a reception direction of the reception antenna based on dense district information which is estimated based on the reception of the signal and indicates a district where the first communication devices are located with high density exceeding a predetermined reference by the relay device; and a second transmission step of transmitting the signal to the second communication device by the relay device.

One aspect of the present invention is a program causing a computer to function as the relay device.

Advantageous Effects of Invention

According to the present invention, it is possible to inhibit deterioration in reliability of communication.

DESCRIPTION OF EMBODIMENTS

Embodiments of the present invention will now be described in detail with reference to the drawings.

First Embodiment

Figure 1:
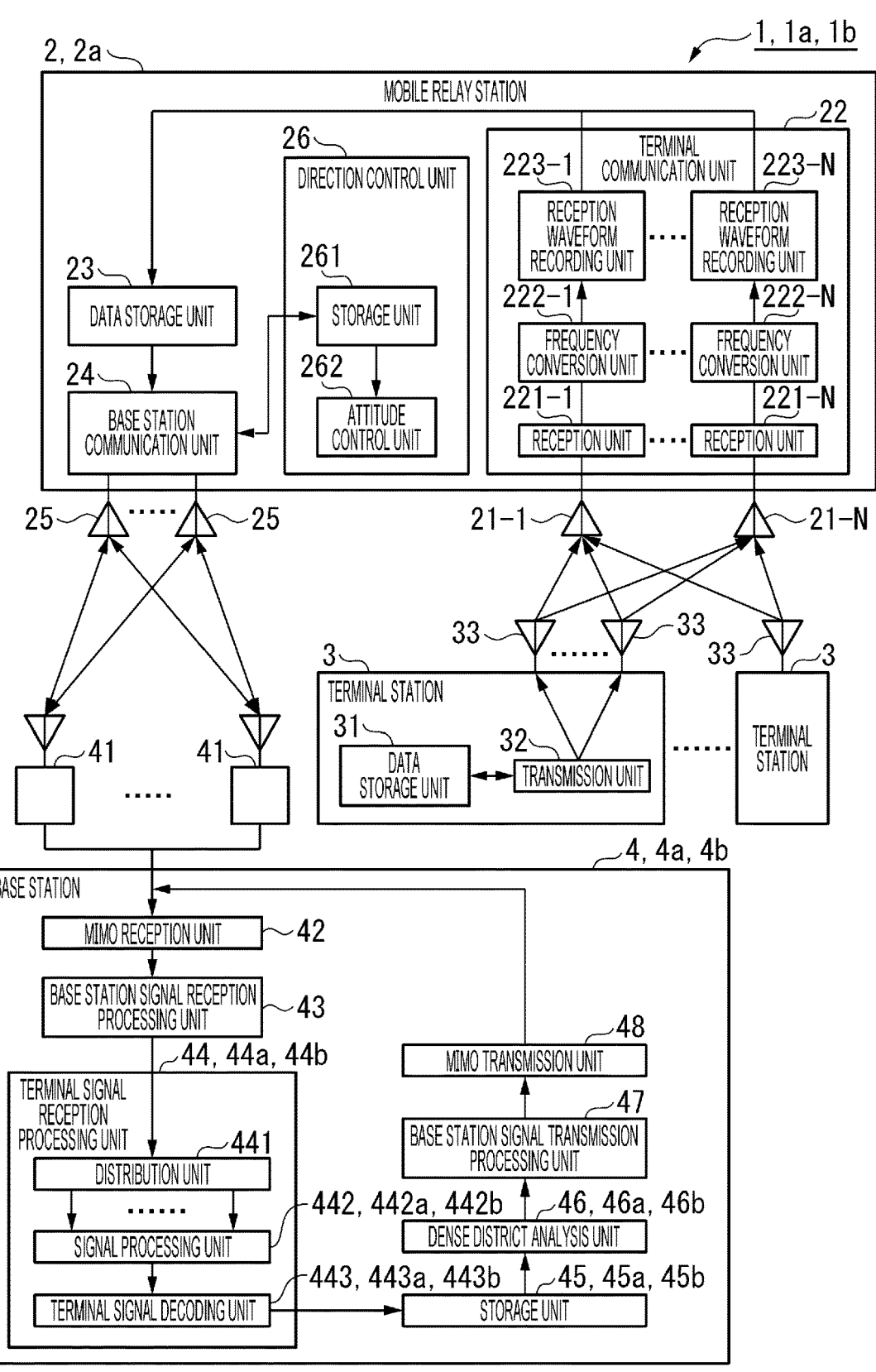
FIG. 1 is a diagram illustrating a configuration of a wireless communication system according to a first embodiment of the present invention.

FIG. 1 is a diagram illustrating a configuration of a wireless communication system 1 according to a first embodiment. The wireless communication system 1 includes a mobile relay station 2, a terminal station 3, and a base station 4. Although any number of mobile relay stations 2, any number of terminal stations 3, and any number of base stations 4 included in the wireless communication system 1 can be used, it is assumed that the number of terminal stations 3 is large. The wireless communication system 1 is a communication system that transmits information for which immediacy is not required. The information transmitted from each of the plurality of terminal stations 3 is transmitted via the mobile relay station 2 to be collected by the base station 4.

The mobile relay station 2 is an example of a relay device (a relay apparatus) which is mounted on a mobile object and for which a communicable area moves over time. The mobile relay station 2 is provided in, for example, a low earth orbit (LEO) satellite. An altitude of the LEO satellite is equal to or less than 2000 [km], and the LEO satellite orbits the earth about every 1.5 hours. The terminal station 3 and the base station 4 are installed on the earth such as on the ground or on the sea. The plurality of terminal stations 3 are located at different places. The terminal stations 3 are, for example, IoT terminals.

The terminal station 3 collects data such as environmental data detected by a sensor and wirelessly transmits the collected data to the mobile relay station 2. In the drawing, only two terminal stations 3 are illustrated. The mobile relay station 2 receives data transmitted from each of the plurality of terminal stations 3 by a wireless signal while moving above the earth. The mobile relay station 2 accumulates the received data. The mobile relay station 2 wirelessly transmits the accumulated data collectively to the base station 4 at a timing at which communication with the base station 4 is possible. The base station 4 receives data collected by the terminal station 3 from the mobile relay station 2.

As the mobile relay station 2, it is conceivable to use a relay station mounted on an unmanned aerial vehicle such as a geostationary satellite, a drone, or a high altitude platform station (HAPS). However, in the case of a relay station mounted on a geostationary satellite, although a coverage area (footprint) on the ground is large, a link budget for an IoT terminal installed on the ground is very small due to a high altitude. On the other hand, in the case of a drone or a relay station mounted on an HAPS, although a link budget is high, a coverage area is narrow. A battery is necessary in a drone and a solar panel is necessary in an HAPS.

Accordingly, in the present embodiment, the mobile relay station 2 is mounted on an LEO satellite that orbits over the earth. Accordingly, the link budget falls within a limit, and since there is no air resistance to orbit outside the atmosphere, less fuel is consumed in the LEO satellite. The footprint is also greater than that in a case where a relay station is mounted on a drone or an HAPS.

Since the mobile relay station 2 mounted on the LEO satellite performs communication while moving at a high speed, a time in which each terminal station 3 or base station 4 can communicate with the mobile relay station 2 is limited. Specifically, the mobile relay station 2 passes through the sky in a few minutes when viewed from the ground. In addition, wireless communication schemes of various specifications are used for the terminal station 3. Accordingly, the mobile relay station 2 receives a terminal uplink signal from the terminal station 3 within coverage at a present position during movement and stores waveform data of the received terminal uplink signal. The mobile relay station 2 receives the terminal uplink signal using a plurality of antennas.

The mobile relay station 2 wirelessly transmits the base station downlink signal in which the waveform data of the terminal uplink signal is set to the base station 4 at the timing when the base station 4 is in the coverage. The mobile relay station 2 transmits a base station downlink signal through a plurality of antennas. Hereinafter, a case where multiple input multiple output (MIMO) is used to transmit base station downlink signals will be described as an example.

In the present embodiment, the base station 4 and the mobile relay station 2 perform communication by MIMO, but the present invention is not limited thereto. At least one of the base station 4 and the mobile relay station 2 may perform communication using one antenna.

The base station 4 demodulates the base station downlink signal received from the mobile relay station 2 to obtain waveform data of the terminal uplink signal. Further, the base station 4 performs signal processing and decoding on the terminal uplink signal indicated by the waveform data to obtain terminal transmission data which is data transmitted by the terminal station 3.

In the wireless communication system 1 according to the present embodiment, as an example, it is assumed that the mobile relay station 2 and the terminal station 3 perform wireless communication using a low power wide area (LPWA). As described above, it is assumed that the number of terminal stations 3 is large. In addition, since a data rate of the LPWA is low, a time in which the terminal station 3 transmits the terminal uplink signal becomes relatively long. Each terminal station 3 may transmit the same terminal uplink signal to the mobile relay station 2 a plurality of times in order to ensure the reliability of communication. Thus, it is assumed that opportunities for the mobile relay station 2 to receive signals transmitted from a plurality of terminal stations 3 densely located in a specific direction at the same timing increase.

In this situation, the mobile relay station 2 on which a plurality of reception antennas are mounted performs reception beam control, and thus it is possible to receive signals transmitted from a plurality of terminal stations 3 at the same timing. In this case, the mobile relay station 2 is required to separate a plurality of received signals. Here, as a direction of the dense district where the terminal stations 3 are dense when viewed from the position of the mobile relay station 2 is different from a front direction (reception direction) of the reception array antenna surface mounted on the mobile relay station 2, performance of signal separation further deteriorates. Accordingly, depending on a positional relationship between the mobile relay station 2 and the dense district of the terminal station 3, the performance of signal separation may deteriorate and the reliability of communication may deteriorate. Therefore, the mobile relay station 2 according to the present embodiment performs control such that the reception direction of the reception antenna is directed in the direction in which the terminal stations 3 are densely located.

Specifically, each terminal station 3 transmits positional information indicating its own position to the mobile relay station 2 at a timing at which communication with the mobile relay station 2 is possible. The mobile relay station 2 collects and accumulates waveform data including positional information of each terminal station 3. The mobile relay station 2 transmits waveform data including the accumulated positional information of each terminal station 3 to the base station 4 at a timing at which the mobile relay station 2 can communicate with the base station 4.

The base station 4 analyzes a distribution of the terminal stations 3 on the earth based on the positional information of each terminal station 3 and specifies a dense district where the terminal stations 3 are densely present. The dense district is a district where the plurality of terminal stations 3 are located with high density exceeding a predetermined reference. The base station 4 determines the reception direction of the antenna 21 at each unit time based on information indicating the specified dense district (hereinafter referred to as "dense district information") and the orbit information of the mobile relay station 2. That is, the base station 4 determines the reception direction such that the reception direction of the antenna 21 is directed in a direction of the dense district (for example, a position in a dense district) in a time zone in which the mobile relay station 2 is located at a position at which communication with the terminal station 3 located in the dense district is possible. The reception direction of the antenna 21 is, for example, a direction of the surface of the array antenna.

Further, the base station 4 specifies the attitude (orientation) of the mobile relay station 2 to be the determined reception direction of the antenna 21. The base station 4 holds in advance, for example, information in which the reception direction of the antenna 21 and the attitude (orientation) of the mobile relay station 2 are associated with each other. The base station 4 transmits information indicating an attitude of the mobile relay station 2 (hereinafter referred to as "direction control information") at each unit time to the mobile relay station 2. The mobile relay station 2 changes the attitude at each unit time in accordance with the direction control information. With such a configuration, the reception direction of the antenna 21 is controlled to be directed in the direction of the dense district of the terminal station 3.

In the present embodiment, the mobile relay station 2 controls the reception direction of the reception antenna by changing its own attitude (orientation), but the present invention is not limited thereto. For example, the mobile relay station 2 may be configured to use the reception antenna capable of arbitrarily changing the reception direction to change the reception direction through an operation of a reception antenna.

In the present embodiment, the base station 4 performs a process of specifying the dense district of the terminal station 3, but the present invention is not limited thereto. For example, the mobile relay station 2 may be configured to perform a process of specifying a dense district of the terminal station 3. In the present embodiment, the base station 4 performs a process of determining an attitude (orientation) of a mobile relay station, but the present invention is not limited thereto. For example, the base station 4 may transmit the dense district information to the mobile relay station 2, and the mobile relay station 2 may generate the direction control information based on the dense district information. That is, at least some functions of the dense district analysis unit 46 may be mounted not on the side of the base station 4 but on the side of the mobile relay station 2. Here, in this case, an installation space of a functional unit corresponding to at least a part of the dense district analysis unit 46, power for operating the functional unit, and the like are necessary for the mobile relay station 2. Therefore, these functional units are desirably provided in the base station 4 or the like on the ground where it is easy to secure an installation space and available power.

In the following description, a process of specifying a dense district of the terminal station 3 and controlling an attitude of the mobile relay station 2 to direct the reception direction of the reception antenna toward a direction of the specified dense district is referred to as a "direction control process". A process of collecting data such as environmental data transmitted from each terminal station 3 via the mobile relay station 2 by the base station 4 is referred to as a "data collection process".

The direction control process is performed, for example, at the time of circulation of the mobile relay station 2 at a time point before the data collection process is started or at the time of first circulation of the mobile relay station 2 at a time point at which the data collection process is started. The direction control process may be executed periodically (for example, every day), for example. Details of a configuration and an operation of each device in the direction control process will be described below. Hereinafter, details of the configuration and the operation of each device in the data collection process will be first described.

(Data Collection Process)

Hereinafter, a configuration of each device in the data collection process will be described.

The mobile relay station 2 includes N antennas 21 (where N is an integer equal to or greater than 2), a terminal communication unit 22, a data storage unit 23, a base station communication unit 24, and a plurality of antennas 25. The N antennas 21 are referred to as antennas 21-1 to 21-N, respectively.

The terminal communication unit 22 includes N reception units 221, N frequency conversion units 222, and N reception waveform recording units 223. The N reception units 221 are referred to as reception units 221-1 to 221-N, the N frequency conversion units 222 are referred to as frequency conversion units 222-1 to 222-N, and the N reception waveform recording units 223 are referred to as reception waveform recording units 223-1 to 223-N.

The reception unit 221-$n$ (where n is an integer equal to or greater than 1 and equal to or less than N) receives the terminal uplink signal through the antenna 21-$n$. The frequency conversion unit 222-$n$ performs frequency conversion (for example, frequency conversion by a quadrature demodulator or the like) on the terminal uplink signal received by the reception unit 221-$n$ from the RF signal into a baseband signal. The reception waveform recording unit 223-$n$ samples a reception waveform of the terminal uplink signal subjected to the frequency conversion by the frequency conversion unit 222-$n$ to generate waveform data indicating a value obtained by the sampling. The reception waveform recording unit 223-$n$ writes, on the data storage unit 23, reception waveform information in which an antenna identifier of the antenna 21-$n$, a reception time of the terminal uplink signal in the antenna 21-$n$, and the generated waveform data are set. The antenna identifier is information for specifying the antenna 21-$n$. The data storage unit 23 stores reception waveform information including waveform data of the terminal uplink signal received by each of the antennas 21-1 to 21-N.

The base station communication unit 24 transmits the reception waveform information to the base station 4 by a base station downlink signal of any wireless communication scheme.

Figure 2:
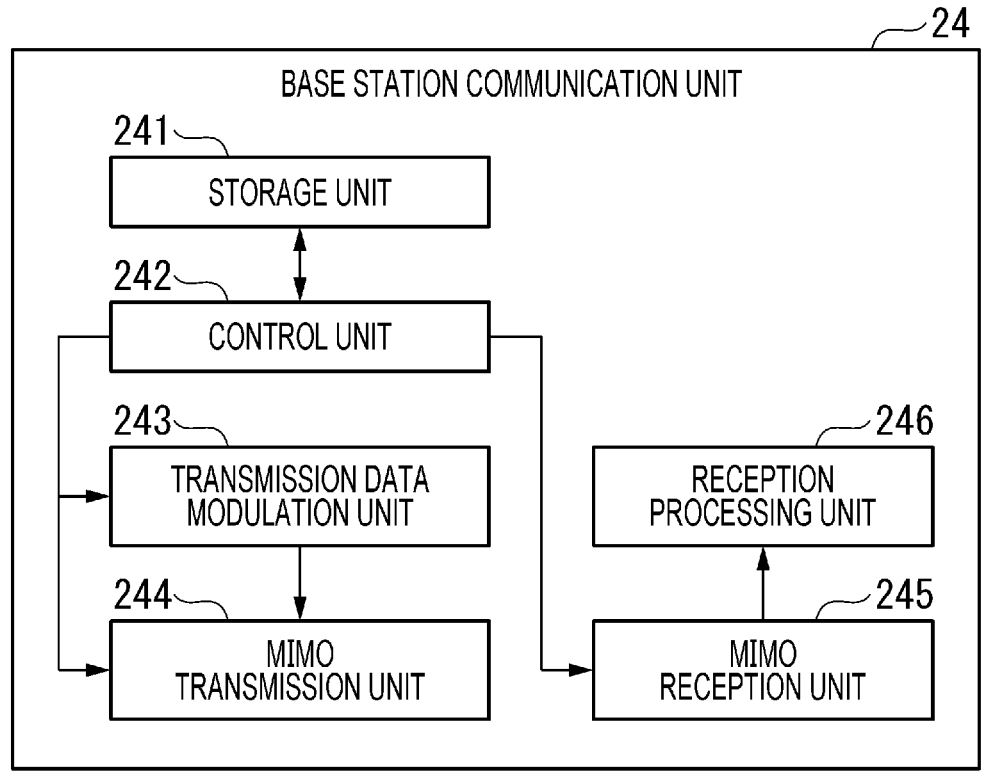
FIG. 2 is a block diagram illustrating a configuration of a base station communication unit of a mobile relay station in the embodiment.

FIG. 2 is a block diagram illustrating a configuration of the base station communication unit 24 of the mobile relay station 2. The base station communication unit 24 includes a storage unit 241, a control unit 242, a transmission data modulation unit 243, and a MIMO transmission unit 244.

The storage unit 241 stores a transmission start timing calculated in advance based on the orbit information of the LEO satellite on which the mobile relay station 2 is mounted and the position of the base station 4. The orbit information of the LEO satellite is information capable of obtaining a position, a speed, a movement direction, and the like of the LEO satellite at any time. The transmission time may be represented by, for example, a time passing from the transmission start timing.

Further, the storage unit 241 stores in advance a weight for each transmission time of the base station downlink signal transmitted from each antenna 25. The weight at each transmission time is calculated based on the orbit information of the LEO satellite and the position of each antenna station 41 included in the base station 4. A constant weight may be used regardless of the transmission time.

For example, the storage unit 241 may store in advance information regarding a plurality of districts into which a range of the ground which is a collection target of sensor data is divided.

The control unit 242 controls the transmission data modulation unit 243 and the MIMO transmission unit 244 such that the reception waveform information is transmitted to the base station 4 at a transmission start timing stored in the storage unit 241. Further, the control unit 242 gives an instruction for the weight at each transmission time read from the storage unit 241 to the MIMO transmission unit 244. The transmission data modulation unit 243 reads the reception waveform information from the data storage unit 23 as transmission data, converts the read transmission data into a parallel signal, and then modulates the parallel signal. The MIMO transmission unit 244 weights the modulated parallel signal by the weight instructed from the control unit 242 and generates the base station downlink signal transmitted from each antenna 25. MIMO transmission unit 244 transmits the generated base station downlink signal from antenna 25 by MIMO.

As illustrated in FIG. 1, the terminal station 3 includes a data storage unit 31, a transmission unit 32 (a transmitter), and one or a plurality of antennas 33. The data storage unit 31 stores sensor data or the like which is a collection target. The transmission unit 32 reads the sensor data from the data storage unit 31 as terminal transmission data and wirelessly transmits a terminal uplink signal in which the read terminal transmission data is set from the antenna 33 at a timing at which communication with the mobile relay station 2 is possible.

The transmission unit 32 transmits a signal by low power wide area (LPWA), for example. LPWA includes LoRaWAN (registered trademark), Sigfox (registered trademark), Long Term Evolution for machines (LTE-M), and narrow band (NB)-IoT, but any wireless communication scheme can be used. The transmission unit 32 may perform transmission with another terminal station 3 by time division multiplexing, orthogonal frequency division multiplexing (OFDM), or the like. The transmission unit 32 determines a channel and a transmission timing to be used for the own station to transmit a terminal uplink signal in accordance with a method determined in advance in a wireless communication scheme to be used. The transmission unit 32 may perform beam formation of signals transmitted from the plurality of antennas 33 in accordance with a method determined in advance in a wireless communication scheme to be used.

The base station 4 includes a plurality of antenna stations 41, a MIMO reception unit 42, a base station signal reception processing unit 43, and a terminal signal reception processing unit 44.

The antenna stations 41 are arranged at positions away from the other antenna stations 41 so that an arrival angle difference of signals from the plurality of antennas 25 of the mobile relay station 2 increases. Each antenna station 41 converts the base station downlink signal received from the mobile relay station 2 into an electrical signal and outputs the electrical signal to the MIMO reception unit 42.

MIMO reception unit 42 aggregates the base station downlink signals received by the plurality of antenna stations 41. The MIMO reception unit 42 stores a weight at each reception time for the base station downlink signal received by each of the antenna stations 41 based on the orbit information of the LEO satellite and the position of each of the antenna stations 41. The MIMO reception unit 42 multiplies the base station downlink signal input from each antenna station 41 by a weight corresponding to the reception time of the base station downlink signal and combines the reception signals multiplied by the weight. The same weight may be used regardless of a reception time. The base station signal reception processing unit 43 demodulates and decodes the combined reception signal to obtain reception waveform information. The base station signal reception processing unit 43 outputs the reception waveform information to the terminal signal reception processing unit 44.

The terminal signal reception processing unit 44 performs a reception process for the terminal uplink signal indicated by the reception waveform information. At this time, the terminal signal reception processing unit 44 acquires the terminal transmission data by performing the reception process using a wireless communication scheme used for transmission by the terminal station 3. The terminal signal reception processing unit 44 includes a distribution unit 441, a signal processing unit 442, and a terminal signal decoding unit 443.

The distribution unit 441 reads waveform data at the same reception time from the reception waveform information, and outputs the read waveform data to the signal processing unit 442 for each antenna identifier associated with the waveform data.

The signal processing unit 442 performs a process such as frame detection (terminal signal detection), Doppler shift compensation, and offline beam control.

The frame detection (terminal signal detection) is a process of detecting a section including a terminal transmission signal (terminal transmission frame) from the waveform data.

The Doppler shift compensation is a process of compensating a Doppler shift of the terminal uplink signal received by the antenna 21-$n$ of the mobile relay station 2 with respect to a signal indicated by the waveform data. The Doppler shift received by the terminal uplink signal received by each antenna 21-$n$ is calculated in advance based on the position of the terminal station 3 and the orbit information of the LEO on which the mobile relay station 2 is mounted.

The offline beam control is a process of performing reception beam control as post-processing performed by the signal processing unit 442 (instead of performing reception beam control in the mobile relay station 2).

The signal processing unit 442 outputs the symbol obtained as a result of the foregoing process to the terminal signal decoding unit 443.

The terminal signal decoding unit 443 decodes the symbol output from signal processing unit 442 to obtain terminal transmission data transmitted from terminal station 3.

Hereinafter, an operation of the wireless communication system 1 in the data collection process will be described.

Figure 3:
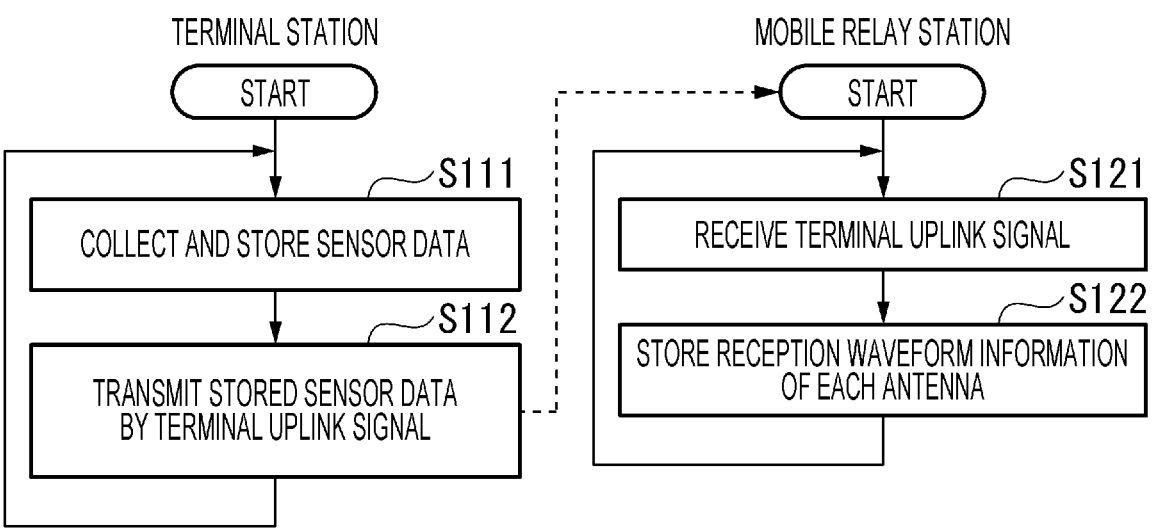
FIG. 3 is a flowchart illustrating a data collection process by the wireless communication system according to the embodiment.

FIG. 3 is a flowchart illustrating an operation of the wireless communication system 1 when a terminal uplink signal is transmitted from the terminal station 3.

The terminal station 3 acquires sensor data detected by a sensor (not illustrated) provided outside or inside at any time and writes the acquired sensor data on the data storage unit 31 (step S111). The transmission unit 32 reads the sensor data from the data storage unit 31 as terminal transmission data. The transmission unit 32 wirelessly transmits the terminal uplink signal in which the terminal transmission data is set from the antenna 33 at a transmission start timing obtained in advance based on the orbit information of the LEO satellite on which the mobile relay station 2 is mounted (step S112). The terminal station 3 repeats the process from step S111. The terminal station 3 may perform transmission with another terminal station 3 by time division multiplexing, OFDM, MIMO, or the like.

The reception units 221-1 to 221-N of the mobile relay station 2 receive the terminal uplink signal transmitted from the terminal station 3 (step S121). In accordance with a wireless communication scheme of the transmission source terminal station 3, there are a case where the terminal uplink signal is received from only one terminal station 3 in a time division manner at the same frequency and a case where the terminal uplink signals are simultaneously received from a plurality of terminal stations 3 at the same frequency. The frequency conversion units 222-1 to 222-N perform frequency conversion (for example, frequency conversion by a quadrature demodulator or the like) on the terminal uplink signals received by the reception units 221-1 to 221-N from RF signals to baseband signals.

The reception waveform recording units 223-1 to 223-N sample the reception waveforms of the terminal uplink signals subjected to the frequency conversion by the frequency conversion units 222-1 to 222-N to generate waveform data indicating values obtained by the sampling. The reception waveform recording units 223-1 to 223-N write the reception waveform information in which the antenna identifiers of the antennas 21-1 to 21-N, the reception times of the terminal uplink signals in the antennas 21-1 to 21-N, and the generated waveform data are set on the data storage unit 23. (Step S122). The mobile relay station 2 repeats the process from step S121.

Figure 4:
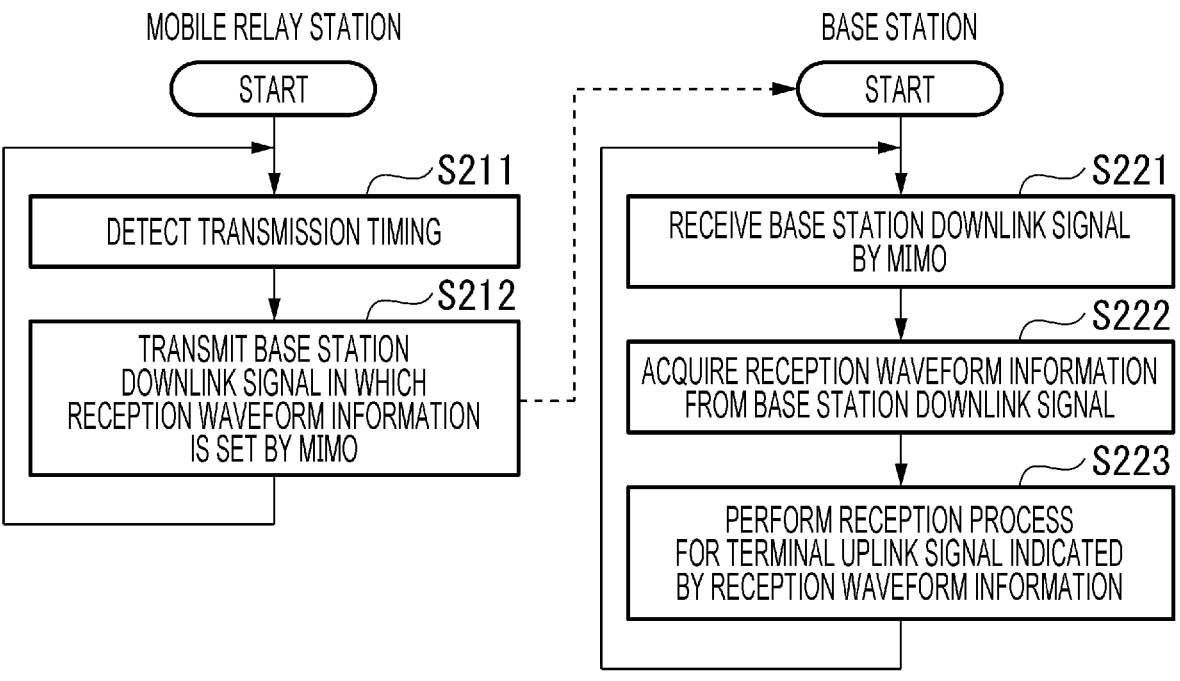
FIG. 4 is a flowchart illustrating a data collection process by the wireless communication system according to the embodiment.

FIG. 4 is a flowchart illustrating a process of the wireless communication system 1 when a base station downlink signal is transmitted from the mobile relay station 2. When the transmission start timing stored in the storage unit 241 is detected, the control unit 242 included in the base station communication unit 24 of the mobile relay station 2 instructs the transmission data modulation unit 243 and the MIMO transmission unit 244 to transmit the reception waveform information (step S211).

The transmission data modulation unit 243 reads the reception waveform information accumulated in the data storage unit 23 as transmission data, performs parallel conversion on the read transmission data, and then modulates the transmission data. The MIMO transmission unit 244 weights the transmission data modulated by the transmission data modulation unit 243 by the weight instructed from the control unit 242 to generate a base station downlink signal which is a transmission signal transmitted from each antenna 25. The MIMO transmission unit 244 transmits each generated base station downlink signal from the antenna 25 by MIMO (step S212). The mobile relay station 2 repeats the process from step S211.

The antenna station 41 of the base station 4 receives the base station downlink signal from the mobile relay station 2 by MIMO (step S221). Each antenna station 41 outputs a reception signal obtained by converting the received base station downlink signal into an electrical signal to the MIMO reception unit 42. The MIMO reception unit 42 synchronizes timings of the reception signals received from antenna stations 41. The MIMO reception unit 42 multiplies and adds the weight to the reception signal received by each antenna station 41. The base station signal reception processing unit 43 demodulates the added reception signal and decodes the demodulated reception signal (step S222). The base station signal reception processing unit 43 outputs the reception waveform information obtained by the decoding to the terminal signal reception processing unit 44.

The distribution unit 441 of the terminal signal reception processing unit 44 reads waveform data having the same reception time from the reception waveform information, and outputs the read waveform data to the signal processing unit 442 for each antenna identifier associated with the waveform data. The signal processing unit 442 performs a process such as frame detection (terminal signal detection), Doppler shift compensation, and offline beam control. The signal processing unit 442 outputs the symbol obtained as a result of the foregoing process to the terminal signal decoding unit 443.

The terminal signal decoding unit 443 decodes the symbol output from the signal processing unit 442 in accordance with a specified wireless communication scheme to obtain terminal transmission data transmitted from the terminal station 3 (step S223). The terminal signal decoding unit 443 can also use a decoding scheme in which a calculation load is large, such as successive interference cancellation (SIC). The base station 4 repeats the process from step S221.

(Direction Control Process)

Hereinafter, a configuration of each device in the direction control process will be described.

A configuration of the terminal station 3 will be described. The data storage unit 31 stores positional information indicating the own position in advance. For example, the positional information is information indicating latitude and longitude. For example, the terminal station 3 includes a positioning system such as a global positioning system (GPS) reception unit (not illustrated). For example, the positional information is two-dimensional or three-dimensional coordinate data obtained by a positioning system.

The transmission unit 32 reads the positional information from the data storage unit 31 as terminal transmission data, and wirelessly transmits a terminal uplink signal in which the read terminal transmission data is set from the antenna 33 at a timing at which communication with the mobile relay station 2 is possible.

A configuration of the mobile relay station 2 will be described. The reception unit 221-*n* (where n is an integer equal to or greater than 1 and equal to or less than N) receives the terminal uplink signal transmitted from the terminal station 3 through the antenna 21-*n*. In the terminal uplink signal, the terminal transmission data indicating positional information of the terminal station 3 that has transmitted the terminal uplink signal is set. The frequency conversion unit 222-*n* performs frequency conversion (for example, frequency conversion by a quadrature demodulator or the like) on the terminal uplink signal received by the reception unit 221-*n* from the RF signal into a baseband signal. The reception waveform recording unit 223-*n* samples a reception waveform of the terminal uplink signal subjected to the frequency conversion by the frequency conversion unit 222-*n* to generate waveform data indicating a value obtained by the sampling. The reception waveform recording unit 223-*n* writes an antenna identifier of the antenna 21-*n*, a reception time of the terminal uplink signal in the antenna 21-*n*, and the reception waveform information in which the generated waveform data is set on the data storage unit 23. The data storage unit 23 stores reception waveform information including waveform data of the terminal uplink signal received by each of the antennas 21-1 to 21-N.

The base station communication unit 24 transmits the reception waveform information to the base station 4 by a base station downlink signal of any wireless communication scheme. Specifically, the control unit 242 of the base station communication unit 24 controls the transmission data modulation unit 243 and the MIMO transmission unit 244 such that transmit the reception waveform information to the base station 4 at the transmission start timing stored in the storage unit 241. Further, the control unit 242 gives an instruction for the weight at each transmission time read from the storage unit 241 to the MIMO transmission unit 244. The transmission data modulation unit 243 reads the reception waveform information from the data storage unit 23 as transmission data, converts the read transmission data into a parallel signal, and then modulates the parallel signal. The MIMO transmission unit 244 weights the modulated parallel signal by the weight instructed from the control unit 242 and generates the base station downlink signal transmitted from each antenna 25. MIMO transmission unit 244 transmits the generated base station downlink signal from antenna 25 by MIMO.

As illustrated in FIG. 2, the base station communication unit 24 of the mobile relay station 2 further includes a MIMO reception unit 245 and a reception processing unit 246. As illustrated in FIG. 1, the mobile relay station 2 further includes a direction control unit 26. The direction control unit 26 includes a storage unit 261 and an attitude control unit 262.

The MIMO reception unit 245 receives the base station uplink signal through the antenna 25. The direction control information indicating an attitude (orientation) of the mobile relay station at each unit time is set in the base station uplink signal. The reception processing unit 246 demodulates and decodes the base station uplink signal to obtain the direction control information. The reception processing unit 246 records the direction control information in the storage unit 261.

The attitude control unit 262 acquires the direction control information recorded on the storage unit 261. The attitude control unit 262 controls the attitude as needed such that the attitude (orientation) of the mobile relay station 2 designated with the direction control information is obtained in a time zone designated by the direction control information. Accordingly, control is performed such that the reception direction of the antenna 21-*n* is directed in the direction of the dense district of the terminal station 3 located in the communicable range.

For example, when the antenna 21-*n* is a reception antenna that has a mechanism capable of changing the reception direction arbitrarily, only the reception direction of the antenna 21-*n* may be changed instead of changing the attitude (orientation) itself of the mobile relay station 2. In this case, the base station 4 generates the direction control information indicating the reception direction of the antenna 21-$n$ at each unit time, sets the generated direction control information in the base station uplink signal, and transmits the direction control information to the mobile relay station 2.

The attitude of the mobile relay station 2 is controlled such that the reception direction of the antenna 21-$n$ is directed in a predetermined direction (hereinafter also referred to as a "normal direction") such as a central direction of the earth, for example, in a time zone in which the mobile relay station 2 is not located at a position at which the mobile relay station 2 can communicate with the terminal station 3 located in a dense district. The attitude of the mobile relay station 2 is controlled such that the reception direction of the antenna 21-$n$ is the direction in which the dense district is located (for example, the direction of the center of the dense district) in a time zone in which the mobile relay station 2 is located at a position at which the mobile relay station 2 can communicate with the terminal station 3 located in a dense district.

A switching timing of the attitude (that is, the reception direction of the antenna 21-$n$) of the mobile relay station 2 is performed, for example, based on an elevation angle of the mobile relay station 2 at the position of the dense district. For example, when an elevation angle at the position of a certain dense district is equal to or greater than a predetermined threshold, the attitude of the mobile relay station 2 is controlled such that the reception direction of the antenna 21-$n$ is directed to the direction in which the dense district is located. For example, when the elevation angle at the position of the certain dense district is less than the predetermined threshold, the attitude of the mobile relay station 2 is controlled such that the reception direction of the antenna 21-$n$ is directed in a normal direction. Alternatively, the attitude of the mobile relay station 2 is controlled such that the reception direction of the antenna 21-$n$ is directed in the direction in which the dense district to be reached next is located. The elevation angle is specified based on the orbit information of the mobile relay station 2 and the position of the dense district.

A configuration of the base station 4 will be described. MIMO reception unit 42 aggregates the base station downlink signals received by the plurality of antenna stations 41. The MIMO reception unit 42 stores a weight at each reception time for the base station downlink signal received by each of the antenna stations 41 based on the orbit information of the LEO satellite and the position of each of the antenna stations 41. The MIMO reception unit 42 multiplies the base station downlink signal input from each antenna station 41 by a weight corresponding to the reception time of the base station downlink signal and combines the reception signals multiplied by the weight. The same weight may be used regardless of a reception time. The base station signal reception processing unit 43 demodulates and decodes the combined reception signal to obtain reception waveform information. The base station signal reception processing unit 43 outputs the reception waveform information to the terminal signal reception processing unit 44.

The terminal signal reception processing unit 44 performs a reception process for the terminal uplink signal indicated by the reception waveform information. At this time, the terminal signal reception processing unit 44 acquires the terminal transmission data by performing the reception process using a wireless communication scheme used for transmission by the terminal station 3. The terminal signal reception processing unit 44 includes a distribution unit 441, a signal processing unit 442, and a terminal signal decoding unit 443.

The distribution unit 441 reads waveform data at the same reception time from the reception waveform information, and outputs the read waveform data to the signal processing unit 442 for each antenna identifier associated with the waveform data.

The signal processing unit 442 performs a process such as frame detection (terminal signal detection), Doppler shift compensation, and offline beam control. The signal processing unit 442 outputs the symbol obtained as a result of the foregoing process to the terminal signal decoding unit 443.

The terminal signal decoding unit 443 decodes the symbol output from signal processing unit 442 to obtain terminal transmission data transmitted from terminal station 3. The terminal transmission data obtained here is data including positional information of each terminal station 3.

As illustrated in FIG. 1, the base station 4 further includes a storage unit 45, a base station signal transmission processing unit 47, and a MIMO transmission unit 48.

The terminal signal decoding unit 443 records the positional information of each terminal station 3 on the storage unit 45. The storage unit 45 stores the positional information of each terminal station 3. The storage unit 45 stores the orbit information of the mobile relay station 2 in advance. The storage unit 45 stores the transmission start timing calculated in advance based on the orbit information of the LEO satellite on which the mobile relay station 2 is mounted and the position of the base station 4.

The dense district analysis unit 46 (analyzer) acquires the positional information of each terminal station 3 and the orbit information of the mobile relay station 2. The dense district analysis unit 46 analyzes a distribution of the terminal stations 3 on the earth based on the positional information of the terminal stations 3 and generates dense district information indicating the position of the dense district of the terminal stations 3. The dense district analysis unit 46 determines the reception direction of the antenna 21-$n$ at each unit time based on the generated dense district information and the orbit information of the mobile relay station 2.

Further, the dense district analysis unit 46 specifies the attitude (orientation) of the mobile relay station 2 which is directed in the determined reception direction of the antenna 21-$n$. The storage unit 45 holds in advance, for example, information in which the reception direction of the antenna 21-$n$ is associated with the attitude of the mobile relay station 2. The dense district analysis unit 46 generates direction control information indicating the attitude of the mobile relay station 2 at each unit time. The dense district analysis unit 46 outputs the generated direction control information to the base station signal transmission processing unit 47.

The base station signal transmission processing unit 47 acquires the direction control information from the dense district analysis unit 46. The base station signal transmission processing unit 47 sets the direction control information as transmission data, converts the transmission data into a parallel signal, and then modulates the parallel signal. The base station signal transmission processing unit 47 controls the MIMO transmission unit 48 such that the dense district information is transmitted to the mobile relay station 2 at the transmission start timing stored in the storage unit 45.

The MIMO transmission unit 48 weights the modulated parallel signal by a weight and generates the base station uplink signal in which the transmission data indicating the direction control information transmitted from each antenna 25 is set. The MIMO transmission unit 48 transmits the generated base station uplink signals from the plurality of antenna stations 41 to the mobile relay station 2 by MIMO.

Hereinafter, an operation of the wireless communication system 1 in the direction control process will be described.

Figure 5:
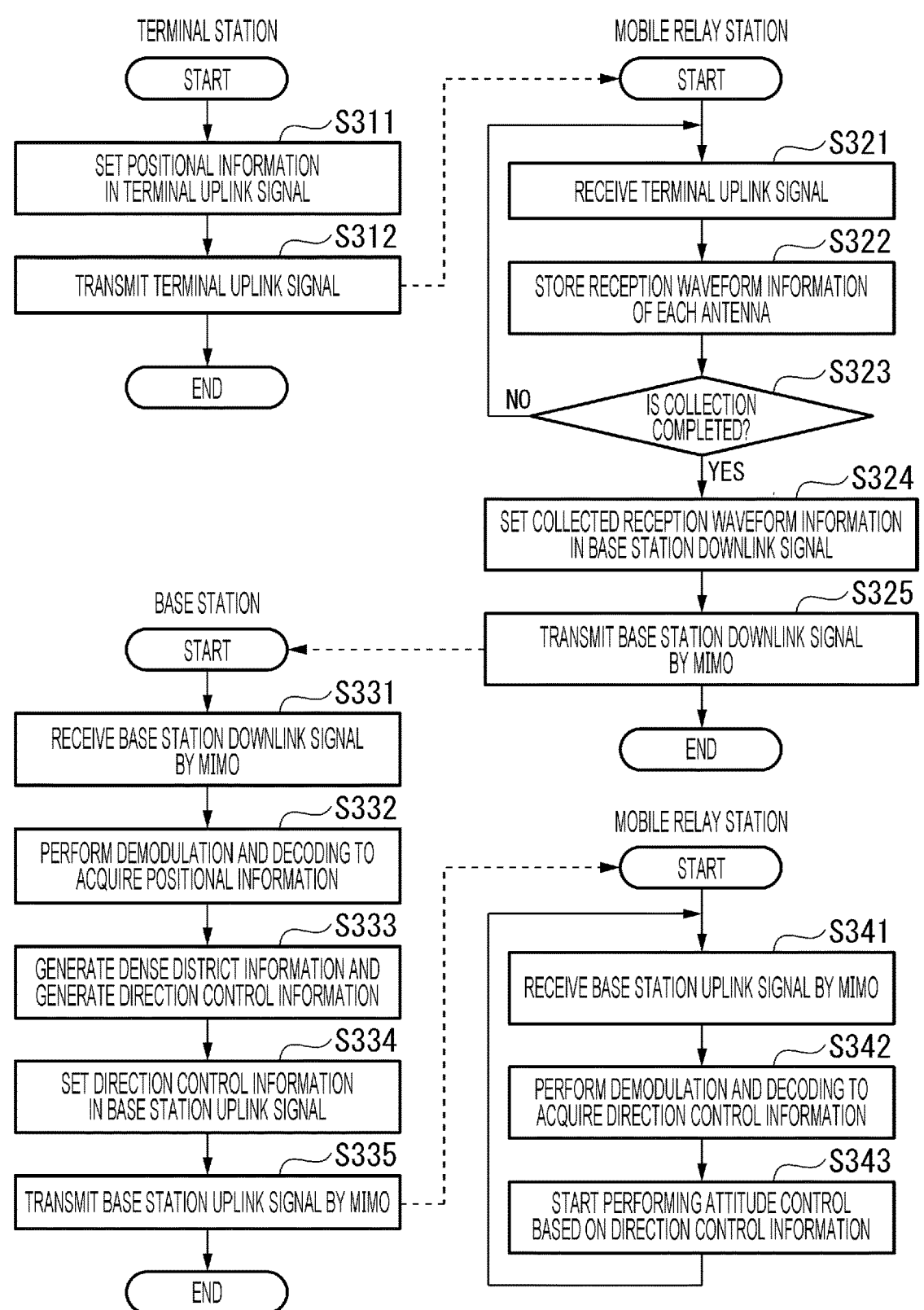
FIG. 5 is a flowchart illustrating a transmission control process by the wireless communication system in the embodiment.

FIG. 5 is a flowchart illustrating processing of the wireless communication system 1 in the direction control process.

The transmission unit 32 of the terminal station 3 reads the positional information indicating the own position from the data storage unit 31 as terminal transmission data and sets the terminal transmission data in the terminal uplink signal (step S311). The transmission unit 32 wirelessly transmits the terminal uplink signal from the antenna 33 at a transmission timing to the mobile relay station 2 (step S312).

The reception units 221-1 to 221-N of the mobile relay station 2 receive the terminal uplink signals using the antennas 21-1 to 21-N (step S321). The frequency conversion units 222-1 to 222-N perform frequency conversion (for example, frequency conversion by a quadrature demodulator or the like) on the terminal uplink signals received by the reception units 221-1 to 221-N from RF signals to baseband signals.

The reception waveform recording units 223-1 to 223-N sample the reception waveforms of the terminal uplink signals subjected to the frequency conversion by the frequency conversion units 222-1 to 222-N to generate waveform data indicating values obtained by the sampling. The reception waveform recording units 223-1 to 223-N write the reception waveform information in which the reception times of the terminal uplink signals in the antennas 21-1 to 21-N, the generated waveform data, and the antenna identifiers of the antennas 21-1 to 21-N are set on the data storage unit 23. The data storage unit 23 stores the reception waveform information written by the reception waveform recording units 223-1 to 223-N (step S322).

The mobile relay station 2 collects the terminal uplink signal from each terminal station 3 (step S323). For example, the mobile relay station 2 completes the collection of the terminal uplink signal at the time of one circulation of the earth. In this case, each terminal station 3 transmits, to the mobile relay station 2, a terminal uplink signal in which the positional information indicating the own position is set while the mobile relay station 2 orbits around the earth once.

When the collection of the terminal uplink signal is completed (YES in step S323), the control unit 242 of the base station communication unit 24 controls the transmission data modulation unit 243 and the MIMO transmission unit 244 such that the reception waveform information is transmitted to the base station 4 at a transmission start timing stored in the storage unit 241. The transmission data modulation unit 243 reads the reception waveform information from the data storage unit 23 as transmission data, modulates the read transmission data, and sets the modulated transmission data as a base station downlink signal (step S324). The MIMO transmission unit 244 converts the base station downlink signal from an electrical signal into a wireless signal and transmits the wireless signal from the antenna 25 by MIMO (step S325).

The antenna station 41 of the base station 4 receives the base station downlink signal from the mobile relay station 2 by MIMO (step S331). Each antenna station 41 converts the received base station downlink signal into an electrical signal. Each antenna station 41 outputs the reception signal converted into the electrical signal to the MIMO reception unit 42. The MIMO reception unit 42 synchronizes timings of the reception signals received from antenna stations 41.

The MIMO reception unit 42 multiplies and adds the weight to the reception signal received by each antenna station 41.

The base station signal reception processing unit 43 demodulates the added reception signal and decodes the demodulated reception signal. The base station signal reception processing unit 43 outputs the reception waveform information obtained through the decoding to the distribution unit 441 of the terminal signal reception processing unit 44. The distribution unit 441 of the terminal signal reception processing unit 44 reads the waveform data at the same reception time from the reception waveform information and outputs the read waveform data to the signal processing unit 442 for each antenna identifier associated with the waveform data.

The signal processing unit 442 performs a process such as frame detection (terminal signal detection), Doppler shift compensation, and offline beam control. The signal processing unit 442 outputs the symbol obtained as a result of the foregoing process to the terminal signal decoding unit 443. The terminal signal decoding unit 443 decodes the symbol output from the signal processing unit 442 in accordance with the specified wireless communication scheme and acquires terminal transmission data transmitted from the terminal station 3. The terminal transmission data obtained here is data including positional information of each terminal station 3 (step S332). At this time, the terminal signal decoding unit 443 acquires terminal transmission data by performing a reception process in accordance with the wireless communication scheme used by the terminal station 3 for transmission. The terminal signal decoding unit 443 records the positional information of each terminal station 3 on the storage unit 45.

The dense district analysis unit 46 acquires the positional information of each terminal station 3 and the orbit information of the mobile relay station 2 from the storage unit 45. The dense district analysis unit 46 analyzes a distribution of the terminal stations 3 on the earth based on the positional information of the terminal stations 3 and generates dense district information indicating the position of the dense district of the terminal stations 3. The position of the dense district is, for example, the position of the center of the dense district. The dense district analysis unit 46 determines the reception direction of the antenna 21-n at each unit time based on the generated dense district information and the orbit information of the mobile relay station 2.

Further, the dense district analysis unit 46 specifies the attitude (orientation) of the mobile relay station 2 which is directed in the determined reception direction of the antenna 21-n. The dense district analysis unit 46 generates direction control information indicating an attitude of the mobile relay station 2 at each unit time (step S333). The dense district analysis unit 46 outputs the generated direction control information to the base station signal transmission processing unit 47.

The base station signal transmission processing unit 47 acquires the direction control information from the dense district analysis unit 46. The base station signal transmission processing unit 47 sets the direction control information as transmission data, converts the transmission data into a parallel signal, and then modulates the parallel signal. The base station signal transmission processing unit 47 controls the MIMO transmission unit 48 such that the direction control information is transmitted to the mobile relay station 2 at the transmission start timing stored in the storage unit 45.

The MIMO transmission unit 48 weights the modulated parallel signal by the weight and sets the transmission data indicating the direction control information transmitted from each antenna 25 in the base station uplink signal (step S334). The MIMO transmission unit 48 transmits the base station uplink signal to which the transmission data is set from the antenna station 41 to the mobile relay station 2 by MIMO (step S335).

The MIMO reception unit 245 of the mobile relay station 2 receives the base station uplink signal by MIMO using the antenna 25 (step S341). The direction control information indicating an attitude (orientation) of the mobile relay station at each unit time is set in the base station uplink signal. The reception processing unit 246 demodulates and decodes the base station uplink signal to obtain the direction control information (step S342). The reception processing unit 246 records the direction control information in the storage unit 261.

The attitude control unit 262 acquires the direction control information recorded on the storage unit 261. The attitude control unit 262 starts controlling the attitude based on the direction control information (step S343). That is, the attitude control unit 262 controls the attitude at any time such that the mobile relay station takes the attitude (orientation) designated in the direction control information in the time zone designated in the direction control information. Accordingly, control is performed such that the reception direction of the antenna 21-$n$ is the direction of the dense district of the terminal station 3. The mobile relay station 2 repeats the process from step S341.

For example, there is no change in the dense district in a case or the like where the terminal station 3 is fixed and installed not to move and the terminal station 3 is not added or deleted. Therefore, there is a case where it is not necessary to update the direction control information. In this case, the mobile relay station 2 may perform the process only once and end the process without repeating the process from step S341.

As described above, the wireless communication system 1 according to the first embodiment estimates a dense district where the terminal stations 3 are located densely in the base station 4 based on the positional information indicating the position of the terminal stations 3. The mobile relay station 2 controls the own attitude under control of the base station 4 such that the reception direction of the antenna 21 is directed in the direction in which there is the estimated dense district. With such a configuration, the wireless communication system 1 according to the first embodiment can match or approximate the reception direction of the antenna 21-$n$ to the direction in which there is the dense district. Therefore, even when terminal uplink signals are simultaneously received from a plurality of terminal stations 3 located in the dense district, it is possible to inhibit deterioration in signal separation performance. Accordingly, the wireless communication system 1 can inhibit deterioration in reliability of communication.

In the wireless communication system 1 according to the first embodiment, the mobile relay station 2 can transmit the data received and accumulated from the plurality of terminal stations 3 with good quality collectively in a short time at a timing at which communication with the base station 4 is possible.

According to the first embodiment, the mobile relay station 2 receives the terminal uplink signal transmitted from the terminal station 3 by diversity reception, MIMO reception, or the like. Therefore, in the wireless communication system 1 according to the first embodiment, a link budget of communication between the mobile relay station 2 and the terminal station 3 can be improved.

Second Embodiment

In the above-described first embodiment, each terminal station 3 transmits positional information indicating the own position to the mobile relay station 2, and the mobile relay station 2 transmits waveform data indicating collected positional information to the base station 4. The base station 4 specifies a dense district of the terminal stations 3 based on the collected positional information, and generates direction control information indicating an attitude (orientation) of the mobile relay station 2 at each unit time. The base station 4 transmits the generated direction control information to the mobile relay station 2 and the mobile relay station 2 controls the attitude based on the direction control information. Accordingly, the reception direction of the antenna 21 is controlled such that the reception direction is directed in the direction of the dense district of the terminal station 3.

On the other hand, in the second embodiment to be described below, the terminal station 3 does not transmit the positional information indicating the own position to the mobile relay station 2. In the second embodiment, a base station 4a measures a received signal strength indicator (RSSI) of the terminal uplink signal per unit time. The RSSI here is, for example, the RSSI per unit time in the frequency band of the terminal uplink signal transmitted from the terminal station 3.

The base station 4a specifies a dense district of the terminal station 3 based on the measured RSSI at each unit time and generates direction control information indicating an attitude (orientation) of the mobile relay station 2a for each unit time. Note that the stronger the RSSI per unit time, the more terminal stations 3 are estimated to be congested in the reception direction of the antenna 21 of the mobile relay station 2a at that time. The base station 4a transmits the generated direction control information to the mobile relay station 2a, and the mobile relay station 2a controls the attitude based on the direction control information. Accordingly, the reception direction of the plurality of antennas 21-$n$ is controlled such that the reception direction is directed in the direction of the dense district of the terminal station 3.

When there is only one reception antenna of the mobile relay station 2a, the mobile relay station 2a receives collectively the terminal uplink signals arriving from the terminal stations 3 located in a district with a radius of about several hundred [km] on the ground, for example, because the half width of the reception antenna is large. Accordingly, with only one reception antenna, it is difficult to estimate the terminal density of each district on the ground from the RSSI. Therefore, the mobile relay station 2a forms a sharp reception beam (narrow beam) by the plurality of reception antennas.

The sharp reception beam is formed as post-processing by transmitting, for example, reception waveform information (waveform data) acquired and recorded through sampling in the mobile relay station 2a to the base station 4a and using the waveform data in the base station 4a. By forming (sweeping) sharp reception beams in order in the direction of each district on the ground through the post-processing in the base station 4a and measuring the RSSI obtained as a result of reception beam processing, the terminal density on the ground for each district can be estimated.

As described above, in the measurement of the RSSI, it is necessary to perform a process with a large calculation amount in which a sharp reception beam is formed by repeatedly using waveform data at a certain time and measurement is performed while sweeping each area on the ground. Further, it is necessary to perform z similar calculation process at each time. Therefore, it is desirable that the RSSI be measured in the base station 4a in which there is a margin in calculation resources as compared with the mobile relay station 2a in many cases.

Hereinafter, a configuration of a wireless communication system 1a according to the second embodiment will be described with reference to FIGS. 1 and 2. Of the constituents of the wireless communication system 1a according to the second embodiment, constituents that have configurations similar to those of the wireless communication system 1 according to the above-described first embodiment are denoted by the same reference numerals, and description thereof may be omitted.

The wireless communication system 1a includes a mobile relay station 2a, a terminal station 3, and a base station 4a.

The mobile relay station 2a includes N antennas 21 (where N is an integer equal to or greater than 2), a terminal communication unit 22, a data storage unit 23, a base station communication unit 24, a plurality of antennas 25, and a direction control unit 26. The terminal communication unit 22 includes reception units 221-1 to 221-N, frequency conversion units 222-1 to 222-N, and reception waveform recording units 223-1 to 223-N. The direction control unit 26 includes a storage unit 261 and an attitude control unit 262.

The MIMO reception unit 245 of the mobile relay station 2a receives the base station uplink signal through the plurality of antennas 25. The direction control information indicating an attitude (orientation) of the mobile relay station at each unit time is set in the base station uplink signal. The reception processing unit 246 demodulates and decodes the base station uplink signal to obtain the direction control information. The reception processing unit 246 records the direction control information in the storage unit 261.

The attitude control unit 262 acquires the direction control information recorded on the storage unit 261. The attitude control unit 262 controls the attitude as needed so that the attitude (orientation) of the mobile relay station 2a designated in the direction control information is obtained in the time zone designated in the direction control information. Accordingly, control is performed such that the reception direction of the antenna 21-n is the direction of the dense district of the terminal station 3.

The base station 4a includes the plurality of antenna stations 41, the MIMO reception unit 42, the base station signal reception processing unit 43, the terminal signal reception processing unit 44, a storage unit 45a, the dense district analysis unit 46a, a base station signal transmission processing unit 47, and a MIMO transmission unit 48.

MIMO reception unit 42 aggregates the base station downlink signals received by the plurality of antenna stations 41. The MIMO reception unit 42 stores a weight at each reception time for the base station downlink signal received by each of the antenna stations 41 based on the orbit information of the LEO satellite and the position of each of the antenna stations 41. The MIMO reception unit 42 multiplies the base station downlink signal input from each antenna station 41 by a weight corresponding to the reception time of the base station downlink signal and combines the reception signals multiplied by the weight. The base station signal reception processing unit 43 demodulates and decodes the combined reception signal to obtain reception waveform information. The base station signal reception processing unit 43 outputs the reception waveform information to the terminal signal reception processing unit 44a.

The signal processing unit 442a of the terminal signal reception processing unit 44a analyzes the reception waveform information and measures the RSSI per unit time. The terminal signal decoding unit 443a records information indicating the RSSI per unit time on the storage unit 45a.

The storage unit 45a stores information indicating the RSSI at each unit time. The storage unit 45a stores orbit information of the mobile relay station 2a in advance. The storage unit 45a stores the transmission start timing calculated in advance based on the orbit information of the LEO satellite on which the mobile relay station 2a is mounted and the position of the base station 4a.

The dense district analysis unit 46a acquires the information indicating the RSSI per unit time and the orbit information of the mobile relay station 2a from the storage unit 45a. The dense district analysis unit 46a generates dense district information indicating the position of the dense district of the terminal station 3 based on the information indicating the RSSI per unit time and the orbit information of the mobile relay station 2a. The dense district analysis unit 46a determines the reception direction of the antenna 21-n at each unit time based on the generated dense district information and the orbit information of the mobile relay station 2a.

Further, the dense district analysis unit 46a specifies the attitude (orientation) of the mobile relay station 2a at which the determined reception direction of the antenna 21-n is formed. The storage unit 45a holds in advance, for example, information in which the reception direction of the antenna 21-n and the attitude of the mobile relay station 2a are associated with each other. The dense district analysis unit 46a generates direction control information indicating the attitude of the mobile relay station 2a at each unit time. The dense district analysis unit 46a outputs the generated direction control information to the base station signal transmission processing unit 47.

The base station signal transmission processing unit 47 acquires the direction control information from the dense district analysis unit 46a. The base station signal transmission processing unit 47 uses the direction control information as transmission data and modulates the transmission data. The base station signal transmission processing unit 47 controls the MIMO transmission unit 48 such that the dense district information is transmitted to the mobile relay station 2a at the transmission start timing stored in the storage unit 45a.

The MIMO transmission unit 48 weights the modulated parallel signal by a weight and generates the base station uplink signal in which the transmission data indicating the direction control information transmitted from each antenna 25 is set. The MIMO transmission unit 48 transmits the generated base station uplink signal from the plurality of antenna stations 41 to the mobile relay station 2a by MIMO.

Hereinafter, an operation of the wireless communication system 1a in the direction control process will be described.

Figure 6:
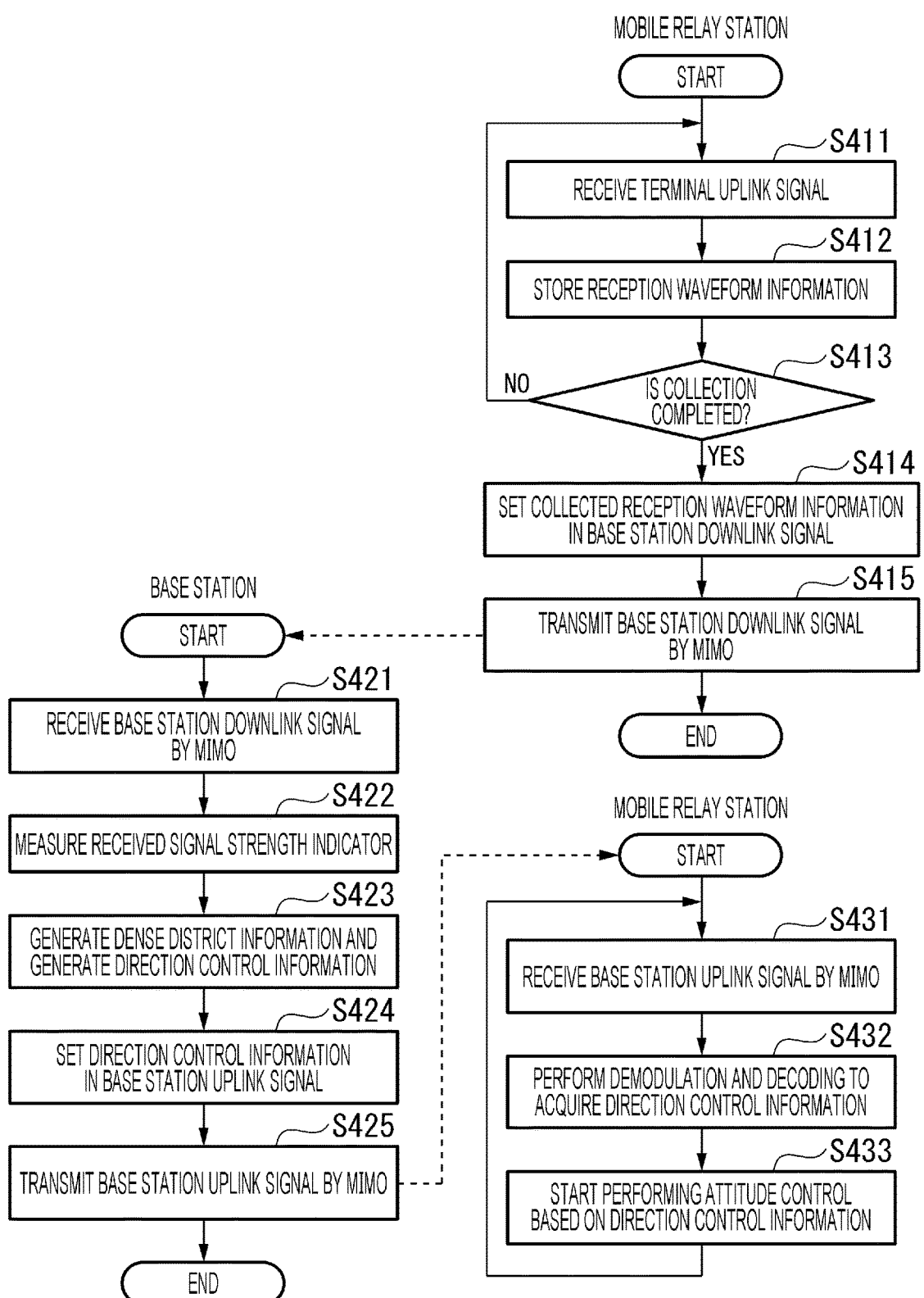
FIG. 6 is a flowchart illustrating a transmission control process by a wireless communication system according to a second embodiment of the present invention.

FIG. 6 is a flowchart illustrating a process of the wireless communication system 1a in the direction control process.

The reception units 221-1 to 221-N of the mobile relay station 2a receive the terminal uplink signals transmitted from the terminal stations 3 by the antennas 21-1 to 21-N (step S411). The frequency conversion units 222-1 to 222-N perform frequency conversion (for example, frequency conversion by a quadrature demodulator or the like) on the terminal uplink signals received by the reception units 221-1 to 221-N from RF signals to baseband signals.

The reception waveform recording units 223-1 to 223-N sample the reception waveforms of the terminal uplink signals subjected to frequency conversion by the frequency conversion units 222-1 to 222-N to generate waveform data indicating values obtained through the sampling. The reception waveform recording units 223-1 to 223-N write the reception waveform information in which the reception times of the terminal uplink signals in the antennas 21-1 to 21-N, the generated waveform data, and the antenna identifiers of the antennas 21-1 to 21-N are set on the data storage unit 23. The data storage unit 23 stores the reception waveform information written by the reception waveform recording units 223-1 to 223-N (step S412).

The mobile relay station 2a collects the terminal uplink signal from each terminal station 3 (step S413). For example, the mobile relay station 2a completes the collection of the terminal uplink signal at the time of one circulation of the earth.

When the collection of the terminal uplink signal is completed (YES in step S413), the control unit 242 of the base station communication unit 24 controls the transmission data modulation unit 243 and the MIMO transmission unit 244 such that the reception waveform information is transmitted to the base station 4a at the transmission start timing stored in the storage unit 241. The transmission data modulation unit 243 reads the reception waveform information as transmission data from the data storage unit 23, modulates the read transmission data and sets the modulated transmission data as a base station downlink signal (step S414). The MIMO transmission unit 244 converts the base station downlink signal from an electrical signal into a wireless signal and transmits the wireless signal from the antenna 25 by MIMO (step S415).

Each antenna station 41 of the base station 4a receives a base station downlink signal from the mobile relay station 2 (step S421). Each antenna station 41 converts the received base station downlink signal into an electrical signal. Each antenna station 41 outputs the reception signal converted into the electrical signal to the MIMO reception unit 42.

MIMO reception unit 42 aggregates the base station downlink signals received by the plurality of antenna stations 41. The MIMO reception unit 42 stores a weight at each reception time for the base station downlink signal received by each of the antenna stations 41 based on the orbit information of the LEO satellite and the position of each of the antenna stations 41. The MIMO reception unit 42 multiplies the base station downlink signal input from each antenna station 41 by a weight corresponding to the reception time of the base station downlink signal and combines the reception signals multiplied by the weight. The base station signal reception processing unit 43 demodulates and decodes the combined reception signal to obtain reception waveform information. The base station signal reception processing unit 43 outputs the reception waveform information to the terminal signal reception processing unit 44.

The signal processing unit 442a of the terminal signal reception processing unit 44a analyzes the reception waveform information and measures the RSSI per unit time (step S422). The terminal signal decoding unit 443a records information indicating the RSSI per unit time on the storage unit 45a.

The dense district analysis unit 46a acquires the information indicating the RSSI per unit time and the orbit information of the mobile relay station 2a from the storage unit 45a. The dense district analysis unit 46a generates dense district information indicating the position of the dense district of the terminal station 3 based on the information indicating the RSSI per unit time and the orbit information of the mobile relay station 2a. The dense district analysis unit 46a determines the reception direction of the antenna 21-n at each unit time based on the generated dense district information and the orbit information of the mobile relay station 2a.

Further, the dense district analysis unit 46a specifies the attitude (orientation) of the mobile relay station 2a at which the determined reception direction of the antenna 21-n is formed. The dense district analysis unit 46a generates direction control information indicating the attitude of the mobile relay station 2a at each unit time (step S423). The dense district analysis unit 46a outputs the generated direction control information to the base station signal transmission processing unit 47.

The base station signal transmission processing unit 47 acquires the direction control information from the dense district analysis unit 46a. The base station signal transmission processing unit 47 uses the direction control information as transmission data and modulates the transmission data. The base station signal transmission processing unit 47 controls the MIMO transmission unit 48 such that the dense district information is transmitted to the mobile relay station 2a at the transmission start timing stored in the storage unit 45a.

The MIMO transmission unit 48 weights the modulated parallel signal by the weight and sets the transmission data indicating the direction control information transmitted from each antenna 25 to the base station uplink signal (step S424). The MIMO transmission unit 48 outputs the base station uplink signal in which the transmission data is set to the plurality of antenna stations 41. The plurality of antenna stations 41 transmit the base station uplink signals to the mobile relay station 2a by MIMO at the transmission start timing stored in the storage unit 45a (step S425).

The MIMO reception unit 245 of the mobile relay station 2a receives the base station uplink signal by MIMO through the plurality of antennas 25 (step S431). The direction control information indicating an attitude (orientation) of the mobile relay station at each unit time is set in the base station uplink signal. The reception processing unit 246 demodulates and decodes the base station uplink signal to obtain direction control information (step S432). The reception processing unit 246 records the direction control information in the storage unit 261.

The attitude control unit 262 acquires the direction control information recorded on the storage unit 261. The attitude control unit 262 starts performing attitude control based on the direction control information (step S433). That is, the attitude control unit 262 controls the attitude at any time such that the attitude (orientation) of the mobile relay station designated in the direction control information is formed at each time designated in the direction control information. Accordingly, control is performed such that the reception direction of the antenna 21-n is the direction of the dense district of the terminal station 3. The mobile relay station 2a repeats the process from step S431.

For example, there is no change in the dense district in a case or the like where the terminal station 3 is fixed and installed not to move and the terminal station 3 is not added or deleted. Therefore, there is a case where it is not necessary to update the direction control information. In this case, the mobile relay station 2a may perform the process only once and end the process without repeating the process from step S431.

As described above, the wireless communication system 1a according to the second embodiment estimates a dense district in which the terminal stations 3 densely exist based on the RSSI of the terminal uplink signal for each unit time. The mobile relay station 2a controls the attitude such that the reception direction of the antenna 21-*n* is directed in the direction in which there is the estimated dense district. With such a configuration, the wireless communication system 1*a* according to the second embodiment can match or approximate the reception direction of the antenna 21-*n* to the direction in which there is the dense district. Therefore, even when the terminal uplink signals are simultaneously received from the plurality of terminal stations 3 located in the dense district, it is possible to inhibit deterioration in signal separation performance. Accordingly, the wireless communication system 1*a* can inhibit deterioration in reliability of communication.

Third Embodiment

In the above-described second embodiment, the base station 4*a* measures the RSSI per unit time of the frequency band of the terminal uplink signal transmitted from the terminal station 3.

On the other hand, in the third embodiment to be described below, the base station 4*b* measures the number of reception signals of the terminal uplink signals per unit time.

The base station 4*b* specifies a dense district of the terminal stations 3 based on the number of measured reception signals for each unit time and generates direction control information indicating an attitude (orientation) of the mobile relay station 2*a* for each unit time. As the number of reception signals per unit time increases, it is estimated that a larger number of terminal stations 3 are dense in the reception direction of the antenna 21-*n* of the mobile relay station 2*a* at that time. The base station 4*b* transmits the generated direction control information to the mobile relay station 2*a*, and the mobile relay station 2*a* controls the attitude based on the direction control information. As a result, the reception direction of the plurality of antennas 21-*n* is controlled such that the reception direction is directed in the direction of the dense district of the terminal stations 3.

When there is only one reception antenna of the mobile relay station 2*a*, the mobile relay station 2*a* receives collectively the terminal uplink signals arriving from the terminal stations 3 located in a district with a radius of about several hundred [km] on the ground, for example, because the half width of the reception antenna is large. Therefore, with only one reception antenna, it is difficult to estimate terminal density for each district on the ground from the number of reception signals. Therefore, the mobile relay station 2*a* forms a sharp reception beam (narrow beam) by the plurality of reception antennas.

The sharp reception beam is formed as post-processing by transmitting, for example, reception waveform information (waveform data) acquired and recorded through sampling in the mobile relay station 2*a* to the base station 4*a* and using the waveform data in the base station 4*a*. By forming (sweeping) sharp reception beams in order in the direction of each district on the ground through the post-processing in the base station 4*a* and measuring the number of reception signals obtained as a result of the reception beam processing, the terminal density on the ground for each district can be estimated.

As described above, in the measurement of the number of reception signals, it is necessary to perform a process with a large calculation amount in which a sharp reception beam is formed by repeatedly using waveform data at a certain time and measurement is performed while sweeping each area on the ground. Further, it is necessary to perform z similar calculation process at each time. Therefore, it is desirable that the number of terminals be measured in the base station 4*b* in which there is a margin in calculation resources as compared with the mobile relay station 2*a* in many cases.

Hereinafter, a configuration of a wireless communication system 1*b* according to a third embodiment will be described with reference to FIGS. 1 and 2. Of the constituents of the wireless communication system 1*b* according to the third embodiment, constituents similar to the constituents of the wireless communication system 1 according to the first embodiment and the constituents of the wireless communication system 1*a* according to the second embodiment are denoted by the same reference numerals, and description thereof may be omitted.

The wireless communication system 1*b* includes a mobile relay station 2*a*, a terminal station 3, and a base station 4*b*.

The mobile relay station 2*a* includes N antennas 21 (where N is an integer equal to or greater than 2), a terminal communication unit 22, a data storage unit 23, a base station communication unit 24, a plurality of antennas 25, and a direction control unit 26. The terminal communication unit 22 includes reception units 221-1 to 221-N, frequency conversion units 222-1 to 222-N, and reception waveform recording units 223-1 to 223-N. The direction control unit 26 includes a storage unit 261 and an attitude control unit 262.

The MIMO reception unit 245 of the mobile relay station 2*a* receives the base station uplink signal through the plurality of antennas 25. The direction control information indicating an attitude (orientation) of the mobile relay station at each unit time is set in the base station uplink signal. The reception processing unit 246 demodulates and decodes the base station uplink signal to obtain the direction control information. The reception processing unit 246 records the direction control information in the storage unit 261.

The attitude control unit 262 acquires the direction control information recorded on the storage unit 261. The attitude control unit 262 controls the attitude as needed so that the attitude (orientation) of the mobile relay station 2*a* designated in the direction control information is obtained in the time zone designated in the direction control information. Accordingly, control is performed such that the reception direction of the antenna 21-*n* is the direction of the dense district of the terminal station 3.

The base station 4*b* includes the plurality of antenna stations 41, the MIMO reception unit 42, the base station signal reception processing unit 43, the terminal signal reception processing unit 44, a storage unit 45*b*, a dense district analysis unit 46*b*, the base station signal transmission processing unit 47, and the MIMO transmission unit 48.

MIMO reception unit 42 aggregates the base station downlink signals received by the plurality of antenna stations 41. The MIMO reception unit 42 stores a weight at each reception time for the base station downlink signal received by each of the antenna stations 41 based on the orbit information of the LEO satellite and the position of each of the antenna stations 41. The MIMO reception unit 42 multiplies the base station downlink signal input from each antenna station 41 by a weight corresponding to the reception time of the base station downlink signal and combines the reception signals multiplied by the weight. The base station signal reception processing unit 43 demodulates and decodes the combined reception signal to obtain reception waveform information. The base station signal reception processing unit 43 outputs the reception waveform information to the terminal signal reception processing unit 44*b*.

The signal processing unit 442*b* of the terminal signal reception processing unit 44*b* analyzes the reception waveform information and measures the number of reception signals per unit time. The terminal signal decoding unit 443*a* records information indicating the number of reception signals per unit time in the storage unit 45*b*.

The storage unit 45*b* stores information indicating the number of reception signals per unit time. The storage unit 45*b* stores orbit information of the mobile relay station 2*a* in advance. The storage unit 45*b* stores the transmission start timing calculated in advance based on the orbit information of the LEO satellite on which the mobile relay station 2*a* is mounted and the position of the base station 4*b*.

The dense district analysis unit 46*b* acquires information indicating the number of reception signals per unit time and orbit information of the mobile relay station 2*a* from the storage unit 45*b*. The dense district analysis unit 46*b* generates dense district information indicating the position of the dense district of the terminal station 3 based on the information indicating the number of reception signals per unit time and the orbit information of the mobile relay station 2*a*. The dense district analysis unit 46*b* determines the reception direction of the antenna 21-*n* at each unit time based on the generated dense district information and the orbit information of the mobile relay station 2*a*.

Further, the dense district analysis unit 46*b* specifies the attitude (orientation) of the mobile relay station 2*a* in which the determined reception direction of the antenna 21-*n* is formed. The storage unit 45*b* holds in advance, for example, information in which the reception direction of the antenna 21-*n* and the attitude of the mobile relay station 2*a* are associated with each other. The dense district analysis unit 46*b* generates direction control information indicating the attitude of the mobile relay station 2*a* at each unit time. The dense district analysis unit 46*b* outputs the generated direction control information to the base station signal transmission processing unit 47.

The base station signal transmission processing unit 47 acquires the direction control information from the dense district analysis unit 46*b*. The base station signal transmission processing unit 47 uses the direction control information as transmission data and modulates the transmission data. The base station signal transmission processing unit 47 controls the MIMO transmission unit 48 such that the dense district information is transmitted to the mobile relay station 2*a* at the transmission start timing stored in the storage unit 45*b*.

The MIMO transmission unit 48 weights the modulated parallel signal by a weight and generates the base station uplink signal in which the transmission data indicating the direction control information transmitted from each antenna 25 is set. The MIMO transmission unit 48 transmits the generated base station uplink signal from the plurality of antenna stations 41 to the mobile relay station 2*a* by MIMO.

Hereinafter, an operation of the wireless communication system 1*b* in the direction control process will be described.

Figure 7:
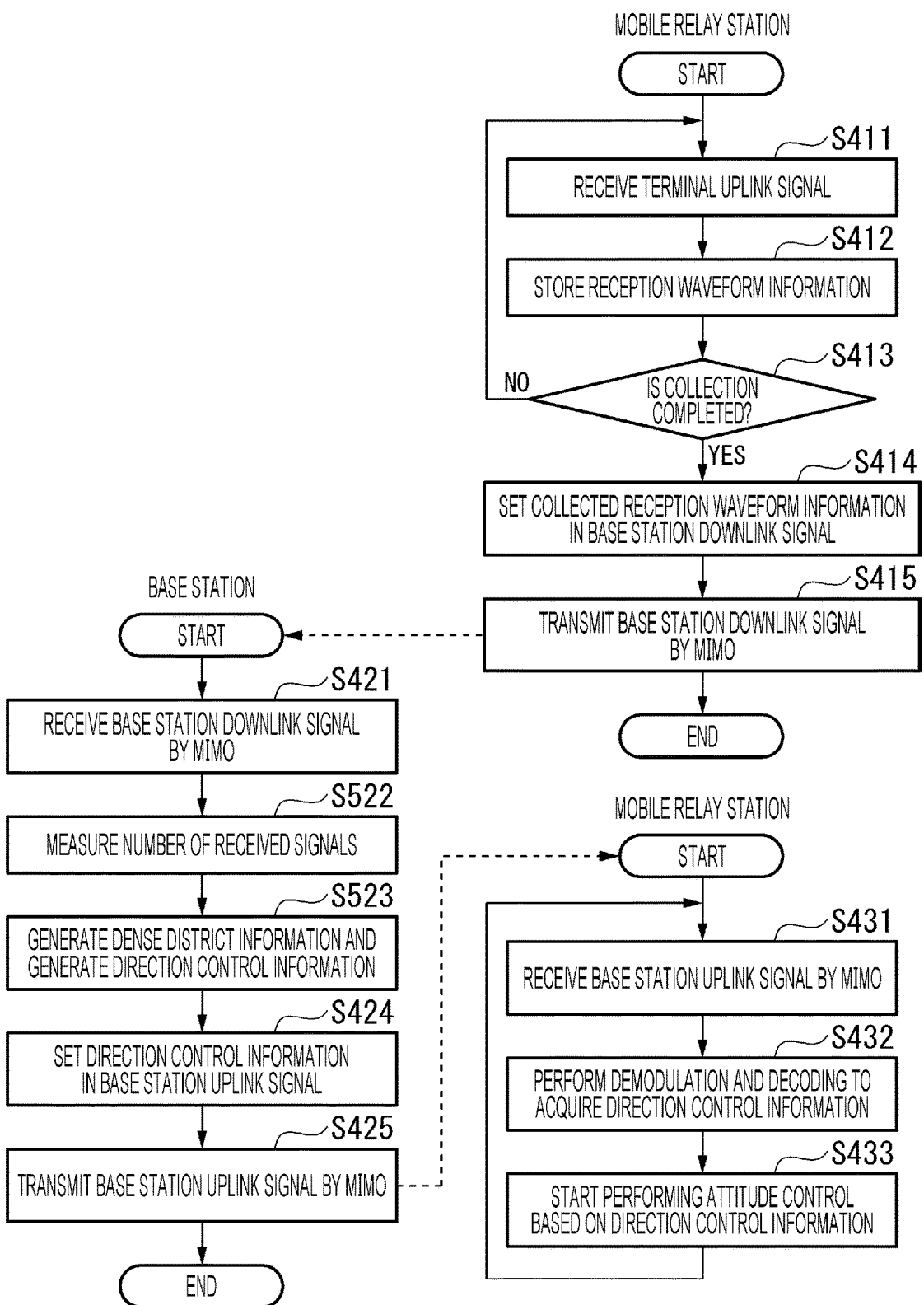
FIG. 7 is a flowchart illustrating a transmission control process by a wireless communication system according to a third embodiment of the present invention.

FIG. 7 is a flowchart illustrating a process of the wireless communication system 1*b* in the direction control process.

In the process of the wireless communication system 1*b* in the direction control process, the process of step S422 and the process of step S423 in the process of the wireless communication system 1*a* in the direction control process illustrated in FIG. 6 are changed to a process of step S522 and a process of step S523 to be described below, respectively.

The signal processing unit 442*b* of the terminal signal reception processing unit 44*b* analyzes the reception waveform information and measures the number of reception signals per unit time (step S522). The terminal signal decoding unit 443*b* records information indicating the number of reception signals per unit time in the storage unit 45*b*.

The dense district analysis unit 46*b* acquires information indicating the number of reception signals per unit time and orbit information of the mobile relay station 2*a* from the storage unit 45*b*. The dense district analysis unit 46*b* generates dense district information indicating the position of the dense district of the terminal station 3 based on the information indicating the number of reception signals per unit time and the orbit information of the mobile relay station 2*a*. The dense district analysis unit 46*b* determines the reception direction of the antenna 21-*n* at each unit time based on the generated dense district information and the orbit information of the mobile relay station 2*a*.

Further, the dense district analysis unit 46*b* specifies the attitude (orientation) of the mobile relay station 2*a* in which the determined reception direction of the antenna 21-*n* is formed. The dense district analysis unit 46*b* generates direction control information indicating the attitude of the mobile relay station 2*a* at each unit time (step S523). The dense district analysis unit 46*b* outputs the generated direction control information to the base station signal transmission processing unit 47.

For example, there is no change in the dense district in a case or the like where the terminal station 3 is fixed and installed not to move and the terminal station 3 is not added or deleted. Therefore, there is a case where it is not necessary to update the direction control information. In this case, the mobile relay station 2*a* may perform the process only once and end the process without repeating the process from step S431.

As described above, the wireless communication system 1*b* according to the third embodiment estimates a dense district where the terminal stations 3 are densely located based on the number of reception signals of the terminal uplink signals per unit time. The mobile relay station 2*a* controls the attitude such that the reception direction of the reception antenna is directed in the direction in which the estimated dense district exists. With such a configuration, the wireless communication system 1*b* according to the third embodiment can match or approximate the reception direction of the reception antenna to the direction in which there is the dense district. Therefore, even when the terminal uplink signals are simultaneously received from the plurality of terminal stations 3 located in the dense district, it is possible to inhibit the deterioration in the performance of the signal separation. As a result, the wireless communication system 1*b* can inhibit deterioration in the reliability of communication.

(Modification 1)

In each of the foregoing embodiments, the frequency conversion units 222-1 to 222-N of the mobile relay station 2 perform frequency conversion (frequency conversion by a quadrature demodulator or the like) on the RF signal into a baseband signal, and then the reception waveform recording units 223-1 to 223-N record the waveform data. However, the present invention is not limited to this configuration. For example, the mobile relay station 2 may record waveform data as an RF signal, and the base station 4 may perform frequency conversion (frequency conversion by a quadrature demodulator or the like) on the RF signal into a baseband signal.

Figure 8:
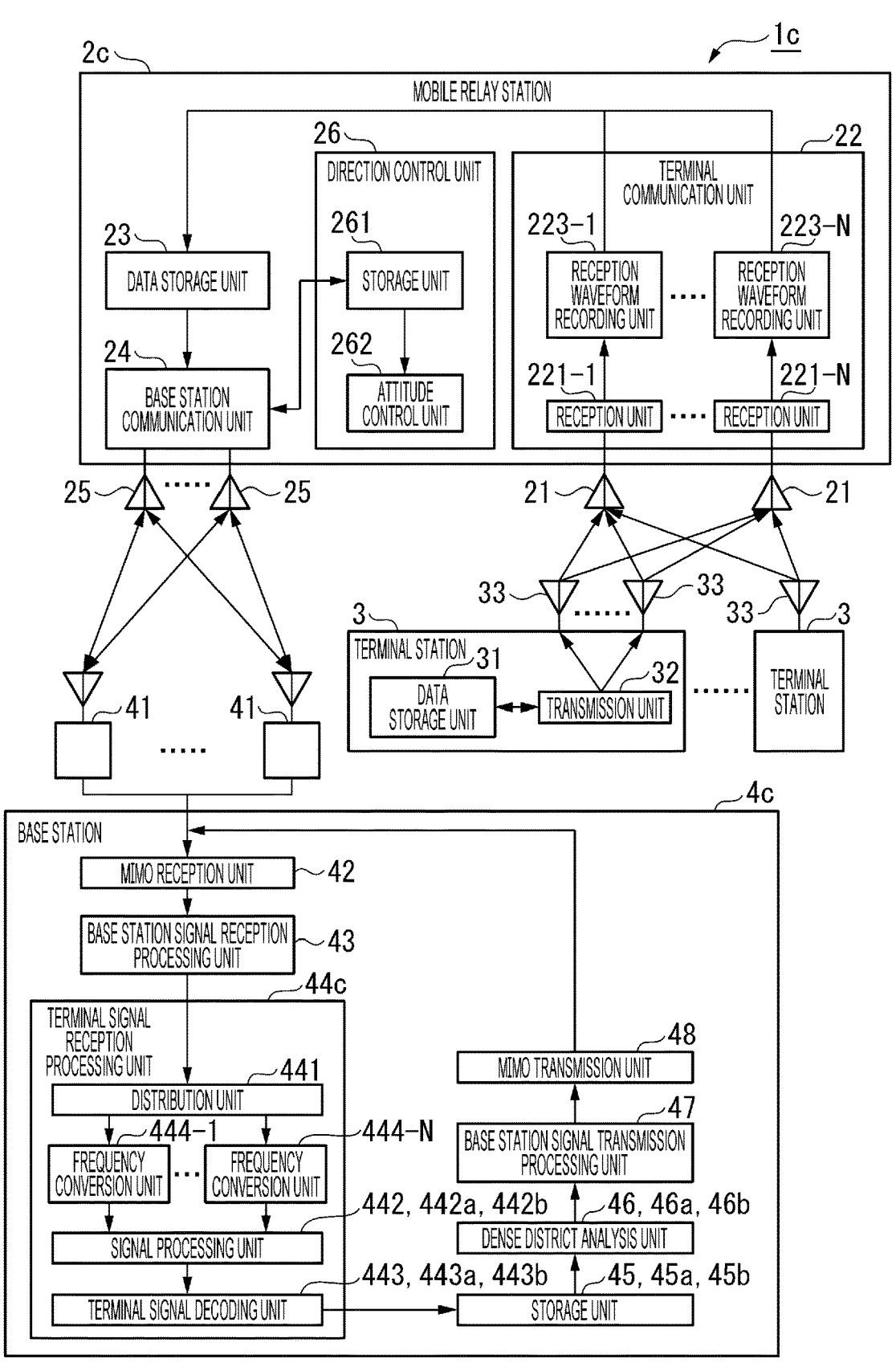
FIG. 8 is a diagram illustrating a configuration of a wireless communication system in Modification 1 of the embodiment of the present invention.

FIG. 8 is a diagram illustrating a configuration of a wireless communication system in Modification 1 of the embodiment of the present invention. Hereinafter, differences from the configuration of the wireless communication system 1 illustrated in FIG. 1 will be mainly described.

A wireless communication system 1c according to Modification 1 includes a mobile relay station 2c, a terminal station 3, and a base station 4c.

(Data Collection Process)

Hereinafter, a configuration of each device in the data collection process will be described.

The mobile relay station 2c includes the N antennas 21 (where N is an integer equal to or greater than 2), the terminal communication unit 22, the data storage unit 23, the base station communication unit 24, and the plurality of antennas 25. The N antennas 21 are referred to as antennas 21-1 to 21-N, respectively.

The terminal communication unit 22 includes the reception units 221-1 to 221-N and the reception waveform recording units 223-1 to 223-N.

The reception unit 221-n (where n is an integer equal to or greater than 1 and equal to or less than N) receives the terminal uplink signal through the antenna 21-n. The reception waveform recording unit 223-n samples the reception waveform while keeping the terminal uplink signal received by the reception unit 221-n as an RF signal and generates waveform data indicating a value obtained through the sampling. The reception waveform recording unit 223-n writes, on the data storage unit 23, reception waveform information in which an antenna identifier of the antenna 21-n, a reception time of the terminal uplink signal in the antenna 21-n, and the generated waveform data are set. The antenna identifier is information for specifying the antenna 21-n.

A configuration of the base station 4c will be described. The base station 4c includes the plurality of antenna stations 41, the MIMO reception unit 42, the base station signal reception processing unit 43, and a terminal signal reception processing unit 44c.

The terminal signal reception processing unit 44c performs a reception process for the terminal uplink signal indicated by the reception waveform information. At this time, the terminal signal reception processing unit 44c acquires the terminal transmission data by performing a reception process according to the wireless communication scheme used for transmission by the terminal station 3. The terminal signal reception processing unit 44c includes the distribution unit 441, the N frequency conversion units 444, the signal processing unit 442, and the terminal signal decoding unit 443. Hereinafter, the N frequency conversion units 444 will be referred to as frequency conversion units 444-1 to 444-N.

The distribution unit 441 reads the waveform data of the same reception time from the reception waveform information and outputs the read waveform data to the frequency conversion units 444-1 to 444-N in accordance with the antenna identifier associated with the waveform data. That is, the distribution unit 441 outputs the waveform data associated with the antenna identifier of the antenna 21-n (where n is an integer equal to or greater than 1 and equal to or less than N) to the frequency conversion unit 444-n.

The frequency conversion units 444-1 to 444-N acquire waveform data and perform frequency conversion (for example, frequency conversion by a quadrature demodulator or the like) from an RF signal to a baseband signal. The frequency conversion units 444-1 to 444-N output the frequency-converted waveform data to the signal processing unit 442.

The signal processing unit 442 performs a process such as frame detection (terminal signal detection), Doppler shift compensation, and offline beam control.

The frame detection (terminal signal detection) is a process of detecting a section including a terminal transmission signal (terminal transmission frame) from the waveform data.

The Doppler shift compensation is a process of compensating a Doppler shift of the terminal uplink signal received by the antenna 21-n of the mobile relay station 2 with respect to a signal indicated by the waveform data. The Doppler shift received by the terminal uplink signal received by each antenna 21-n is calculated in advance based on the position of the terminal station 3 and the orbit information of the LEO on which the mobile relay station 2 is mounted.

The offline beam control is a process of performing reception beam control as post-processing performed by the signal processing unit 442 (instead of performing reception beam control in the mobile relay station 2).

The signal processing unit 442 outputs the symbol obtained as a result of the foregoing process to the terminal signal decoding unit 443.

The terminal signal decoding unit 443 decodes the symbol output from signal processing unit 442 to obtain terminal transmission data transmitted from terminal station 3.

(Direction Control Process)

Hereinafter, a configuration of each device in the direction control process will be described.

A configuration of the mobile relay station 2c will be described. The reception unit 221-n (where n is an integer equal to or greater than 1 and equal to or less than N) receives the terminal uplink signal transmitted from the terminal station 3 through the antenna 21-n. In the terminal uplink signal, the terminal transmission data indicating positional information of the terminal station 3 that has transmitted the terminal uplink signal is set. The reception waveform recording unit 223-n samples the reception waveform while keeping the terminal uplink signal received by the reception unit 221-n as an RF signal and generates waveform data indicating a value obtained through the sampling. The reception waveform recording unit 223-n writes an antenna identifier of the antenna 21-n, a reception time of the terminal uplink signal in the antenna 21-n, and the reception waveform information in which the generated waveform data is set on the data storage unit 23.

A configuration of the base station 4c will be described. The base station 4c includes the plurality of antenna stations 41, the MIMO reception unit 42, the base station signal reception processing unit 43, and a terminal signal reception processing unit 44c.

The terminal signal reception processing unit 44c performs a reception process for the terminal uplink signal indicated by the reception waveform information. At this time, the terminal signal reception processing unit 44c acquires the terminal transmission data by performing a reception process according to the wireless communication scheme used for transmission by the terminal station 3. The terminal signal reception processing unit 44c includes the distribution unit 441, the frequency conversion units 444-1 to 444-N, the signal processing unit 442, and the terminal signal decoding unit 443.

The distribution unit 441 reads the waveform data of the same reception time from the reception waveform information and outputs the read waveform data to the frequency conversion units 444-1 to 444-N in accordance with the antenna identifier associated with the waveform data. That is, the distribution unit 441 outputs the waveform data associated with the antenna identifier of the antenna 21-n to the frequency conversion unit 444-n.

The signal processing unit 442 performs a process such as frame detection (terminal signal detection), Doppler shift compensation, and offline beam control. The signal processing unit 442 outputs the symbol obtained as a result of the foregoing process to the terminal signal decoding unit 443.

The terminal signal decoding unit 443 decodes the symbol output from signal processing unit 442 to obtain terminal transmission data transmitted from terminal station 3. The terminal transmission data obtained here is data including positional information of each terminal station 3.

As described above, the wireless communication system 1c according to Modification 1 records waveform data as an RF signal in the mobile relay station 2 and performs frequency conversion (frequency conversion by a quadrature demodulator or the like) on the RF signal into a baseband signal in the base station 4.

(Modification 2)

In each of the foregoing embodiments, when a plurality of mobile relay stations 2 can be used, control can be performed such that a change angle of the reception direction in the reception of the terminal uplink signal is further reduced. By further reducing the change angle of the reception direction in the reception of the terminal uplink signal, power consumption required to control the reception direction can be inhibited.

For example, when there are a plurality of dense districts of the terminal stations 3, the mobile relay station 2 passing through the vicinity of each dense district may be controlled such that the terminal uplink signal from the terminal station 3 is received. Alternatively, for example, when the trajectories of two mobile relay stations 2 are the same or approximate and the traveling directions are the same, one mobile relay station 2 may receive a terminal uplink signal from a terminal station 3 included in a dense district on the right side with respect to the traveling direction and the other mobile relay station 2 may receive a terminal uplink signal from the terminal station 3 included in a dense district on the left side with respect to the traveling direction.

In each of the foregoing embodiments, the case where the mobile object on which the mobile relay station is mounted is an LEO satellite has been described. However, the mobile object may be another flying object flying in the air, such as a geostationary satellite, a drone, or an HAPS.

According to the above-described embodiment, the relay device relays wireless signals transmitted from the plurality of first communication devices to the second communication device while moving. For example, the relay device is any of the mobile relay stations 2, 2a, and 2c according to the embodiment, the first communication device is the terminal station 3 according to the embodiment, and the second communication device is the base stations 4, 4a, and 4b according to the embodiment.

The relay device includes a first reception unit (a first receiver) and a direction control unit (a direction controller). The first reception unit receives a signal transmitted from each of the plurality of first communication devices through a reception antenna. For example, the first reception unit is any of the reception units 221, 221-1 to 221-N according to the embodiment, the signal is the terminal uplink signal according to the embodiment, and the reception antenna is any of the antennas 21, 21-1 to 21-N according to the embodiment. The direction control unit controls the reception direction of the reception antenna based on dense district information indicating a dense district of the first communication device estimated based on reception of a signal.

According to the above-described embodiment, the wireless communication system includes a plurality of first communication devices, a second communication device, and a relay device that relays signals transmitted from the plurality of first communication devices to the second communication device while moving. The first communication device includes a first transmission unit (a first transmitter) that transmits a signal to the relay device. For example, the first transmission unit is the transmission unit 32 in the embodiment. The relay device includes a first reception unit, a direction control unit, and a second transmission unit (a second transmitter). The first reception unit receives a signal transmitted from each of the plurality of first communication devices through a reception antenna. The direction control unit controls the reception direction of the reception antenna based on dense district information which is estimated based on reception of a signal and indicates a district where the first communication device is located with high density exceeding a predetermined reference. The second transmission unit transmits a signal to the second communication device. For example, the second transmission unit is the MIMO transmission unit 244 according to the embodiment.

The district may be estimated based on positional information included in a signal and indicating the position of the first communication device that has transmitted the signal.

The district may be estimated based on the RSSI of the signal received by the first reception unit and the orbit information of the relay device.

The district may be estimated based on the number of signals received by the first reception unit and the orbit information of the relay device.

The relay device may further include a transmission unit (a transmitter) and a second reception unit (a second receiver). The transmission unit transmits a signal indicating reception information related to signal reception to the second communication device. For example, the transmission unit is the MIMO transmission unit 244 according to the embodiment, and the information regarding the reception of the signal is the positional information indicating the position of the terminal station 3, the RSSI per unit time of the terminal uplink signal, or the number of reception signals per unit time of the terminal uplink signal according to the embodiment. The second reception unit receives a signal which is transmitted from the second communication device and is based on the dense district information indicating the dense district estimated based on the reception information. For example, the second reception unit is the MIMO reception unit 245 according to the embodiment, and the signal which is based on the dense district information is the base station uplink signal according to the embodiment.

The direction control unit may control the reception direction by controlling the attitude of the relay device.

Although the embodiments of the present invention have been described in detail with reference to the drawings, specific configurations are not limited to the embodiments and include design and the like within the scope of the present invention without departing from the gist of the present invention.

At least some of the mobile relay stations 2, 2a, and 2c, the terminal station 3, and the base stations 4, 4a, 4b, and 4c in the above-described embodiments may be implemented by a computer. In such a case, a program that realizes this function may be recorded in a computer-readable recording medium. A program recorded in the recording medium may be read and executed in a computer system to be implemented. Note that the "computer system" mentioned herein includes an OS and hardware such as peripheral devices.

Also, the "computer-readable recording medium" is a portable medium such as a flexible disk, a magneto-optical disk, a ROM, or a CD-ROM, or a storage device such as a hard disk embedded in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the foregoing program may be for implementing some of the functions described above, may be implemented in a combination of the functions described above and a program already recorded in a computer system, or may be implemented with a programmable logic device such as a field programmable gate array (FPGA).

REFERENCE SIGNS LIST 1, 1a, 1b Wireless communication system
2, 2a, 2c Mobile relay station
3 Terminal station
4, 4a, 4b, 4c Base station
21-1 to 21-N, 21-n Antenna
22 Terminal communication unit
23 Data storage unit
24 Base station communication unit
25 Antenna
26 Direction control unit
31 Data storage unit
32 Transmission unit
33 Antenna
41 Antenna station
42 MIMO reception unit
43 Base station signal reception processing unit
44, 44a, 44b, 44c Terminal signal reception processing unit
45a, 45b Storage unit
46, 46a, 46b Dense district analysis unit
47 Base station signal transmission processing unit
48 MIMO transmission unit
221-1 to 221-N, 221-n Reception unit
222-1 to 222-N, 222-n Frequency conversion unit
223-1 to 223-N, 223-n Reception waveform recording unit
241 Storage unit
242 Control unit
243 Transmission data modulation unit
244 MIMO transmission unit
245 MIMO reception unit
246 Reception processing unit
261 Storage unit
262 Attitude control unit
441 Distribution unit
442, 442a, 442b Signal processing unit
443 Terminal signal decoding unit
444-1 to 444-N Frequency conversion unit
The invention claimed is:

1. A relay device that relays wireless signals transmitted from a plurality of first communication devices to a second communication device while moving, the relay device comprising:
a first receiver configured to receive first uplink signals transmitted from the plurality of first communication devices through a reception antenna;

a transmitter configured to transmit a downlink signal indicating reception information regarding reception of the first uplink signals to the second communication device;
a second receiver that receives a second uplink signal which is transmitted from the second communication device and is based on dense district information indicating a district estimated based on the reception information; and
a direction controller configured to control a reception direction of the reception antenna based on the dense district information and indicates the district where the first communication devices are located with high density exceeding a predetermined reference,
wherein the district is estimated based on positional information, which is included in the first uplink signals and indicates positions of the first communication devices that have transmitted the first uplink signals.
2. The relay device according to claim 1, wherein the district is estimated based on a received signal strength indicator of the first uplink signals received by the first receiver and orbit information of the relay device.
3. The relay device according to claim 2, wherein the direction controller controls the reception direction by controlling an attitude of the relay device.
4. The relay device according to claim 1, wherein the district is estimated based on a number of the first uplink signals received by the first receiver and orbit information of the relay device.
5. The relay device according to claim 4, wherein the direction controller controls the reception direction by controlling an attitude of the relay device.
6. The relay device according to claim 1, wherein the direction controller controls the reception direction by controlling an attitude of the relay device.
7. The relay device according to claim 1, wherein the direction controller controls the reception direction by controlling an attitude of the relay device.
8. A wireless communication system comprising:
a plurality of first communication devices;
a second communication device; and
a relay device configured to relay signals transmitted from the plurality of first communication devices to the second communication device while moving,
wherein each of the plurality of first communication devices includes a first transmitter that transmits the first uplink signal to the relay device, and
wherein the relay device includes
a first receiver that receives first uplink signals transmitted from the plurality of first communication devices through a reception antenna,
second transmitter configured to transmit a downlink signal indicating reception information regarding reception of the first uplink signals to the second communication device;
a second receiver that receives a second uplink signal which is transmitted from the second communication device and is based on dense district information indicating a district estimated based on the reception information; and
a direction controller that controls a reception direction of the reception antenna based on the dense district information and indicates the district where the first communication devices are located with high density exceeding a predetermined reference,
wherein the district is estimated based on positional information, which is included in the first uplink signals and indicates positions of the first communication devices that have transmitted the first uplink signals.

9. The wireless communication system according to claim 8, wherein the district is estimated based on a received signal strength indicator of the first uplink signals and orbit information of the relay device.

10. The wireless communication system according to claim 8, wherein the district is estimated based on a number of the received first uplink signals and orbit information of the relay device.

11. The wireless communication system according to claim 8, wherein the second communication device includes a third receiver that receives the downlink signal, an analyzer that estimates the district based on the reception information, and a third transmitter that transmit to the relay device, the second uplink signal which is based on the dense district information indicating the district estimated by the analyzer.

12. The wireless communication system according to claim 8, wherein the direction controller controls the reception direction by controlling an attitude of the relay device.

13. A wireless communication method in which signals transmitted from a plurality of first communication devices to a second communication device are relayed by a relay device that is moving, the method comprising:

a first transmission step in which each of the plurality of first communication devices transmits a first uplink signal to the relay device;

a first reception step in which the relay device receives first uplink signals transmitted from the plurality of first communication devices through a reception antenna;

a second transmission step in which the relay device transmits a downlink signal indicating reception information regarding reception of the first uplink signals to the second communication device;

a second reception step in which the relay device receives a second uplink signal which is transmitted from the second communication device and is based on dense district information indicating a district estimated based on the reception information; and a direction control step in which the relay device controls a reception direction of the reception antenna based on the dense district information and indicates the district where the first communication devices are located with high density exceeding a predetermined reference, where the district is estimated based on positional information, which is included in the first uplink signals and indicates positions of the first communication devices that have transmitted the first uplink signals.

14. A non-transitory storage medium that stores a program causing a computer to execute processes as a relay device, the processes comprising:

receiving first uplink signals transmitted from the plurality of first communication devices through a reception antenna;

transmitting a downlink signal indicating reception information regarding reception of the first uplink signals to the second communication device;

receiving a second uplink signal which is transmitted from the second communication device and is based on dense district information indicating a district estimated based on the reception information; and controlling a reception direction of the reception antenna based on the dense district information and indicates the district where the first communication devices are located with high density exceeding predetermined reference, wherein the district is estimated based on positional information, which is included in the first uplink signals and indicates positions of the first communication devices that have transmitted the first uplink signals.

* * * * *